(12) United States Patent
Ohmi

(10) Patent No.: US 10,584,784 B2
(45) Date of Patent: Mar. 10, 2020

(54) RESIN HELICAL GEAR

(71) Applicant: ENPLAS CORPORATION, Saitama (JP)

(72) Inventor: Kenji Ohmi, Saitama (JP)

(73) Assignee: ENPLAS CORPORATION, Saitama (JP)

(*) Notice: Subject to any disclaimer, the term of this patent is extended or adjusted under 35 U.S.C. 154(b) by 177 days.

(21) Appl. No.: 15/532,773

(22) PCT Filed: Nov. 20, 2015

(86) PCT No.: PCT/JP2015/082680
§ 371 (c)(1),
(2) Date: Jun. 2, 2017

(87) PCT Pub. No.: WO2016/088577
PCT Pub. Date: Jun. 9, 2016

(65) Prior Publication Data
US 2017/0335942 A1    Nov. 23, 2017

(30) Foreign Application Priority Data

Dec. 5, 2014  (JP) .................. 2014-246604
Mar. 17, 2015  (JP) .................. 2015-053136

(51) Int. Cl.
F16H 55/08   (2006.01)
F16H 55/06   (2006.01)
F16H 55/17   (2006.01)

(52) U.S. Cl.
CPC ......... F16H 55/0806 (2013.01); F16H 55/06 (2013.01); F16H 55/088 (2013.01);
(Continued)

(58) Field of Classification Search
CPC ...... F16H 55/06; F16H 55/08; F16H 55/0886; F16H 55/17
(Continued)

(56) References Cited

U.S. PATENT DOCUMENTS

2007/0137355 A1  6/2007  Ohmi et al.
2008/0236320 A1  10/2008  Takumori

FOREIGN PATENT DOCUMENTS

DE   24 45 104    9/1975
EP   1 770 308    4/2007
(Continued)

OTHER PUBLICATIONS

International Search Report dated Dec. 15, 2015 in International (PCT) Application No. PCT/JP2015/082680.

Primary Examiner — Jake Cook
Assistant Examiner — T. Scott Fix
(74) Attorney, Agent, or Firm — Wenderoth, Lind & Ponack, L.L.P.

(57) ABSTRACT

A resin helical gear is formed by setting a first machining reference line obliquely coupling a tooth tip side of a first tooth to a tooth root side of a second tooth on another end side in the tooth width direction along a tooth surface, and a second machining reference line obliquely coupling a tooth tip side of the second tooth to a tooth root side of the first tooth along the tooth surface. Then, the tooth surface is cut out from the first machining reference line to the tooth root of the first tooth while the tooth surface is cut out from the second machining reference line to the tooth root of the second tooth. Then, an involute tooth profile form is left on a tooth tip side of the tooth with respect to the first machining reference line and the second machining reference line.

5 Claims, 19 Drawing Sheets

(52) U.S. Cl.
CPC ......... *F16H 55/0886* (2013.01); *F16H 55/17* (2013.01); *F16H 2055/065* (2013.01)

(58) Field of Classification Search
USPC .................................................. 74/458, 462
See application file for complete search history.

(56) References Cited

FOREIGN PATENT DOCUMENTS

| | | |
|---|---|---|
| EP | 1 832 370 | 9/2007 |
| JP | 8-197332 | 8/1996 |
| JP | 10-89442 | 4/1998 |
| JP | 2006-177415 | 7/2006 |
| JP | 2007-120743 | 5/2007 |
| JP | 2008-240793 | 10/2008 |
| JP | 2008-275060 | 11/2008 |
| JP | 2014-89483 | 5/2014 |

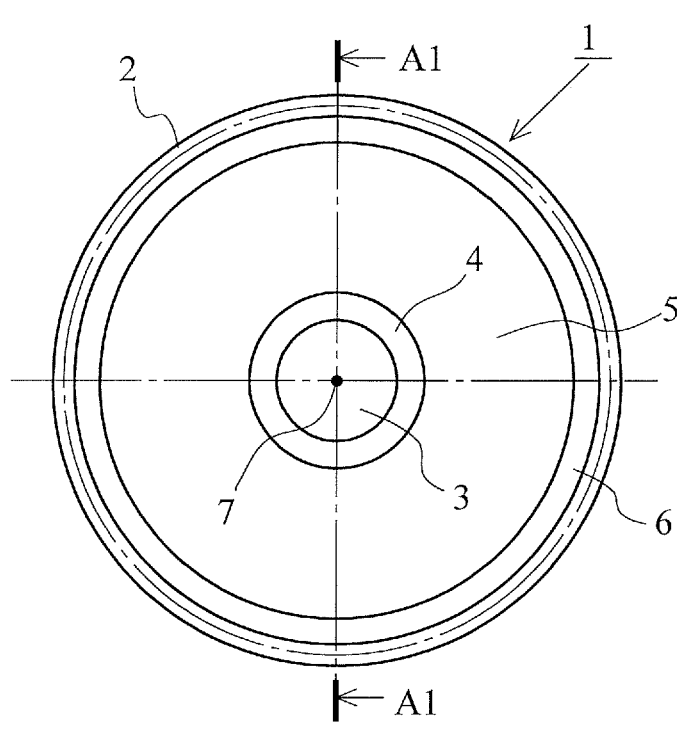
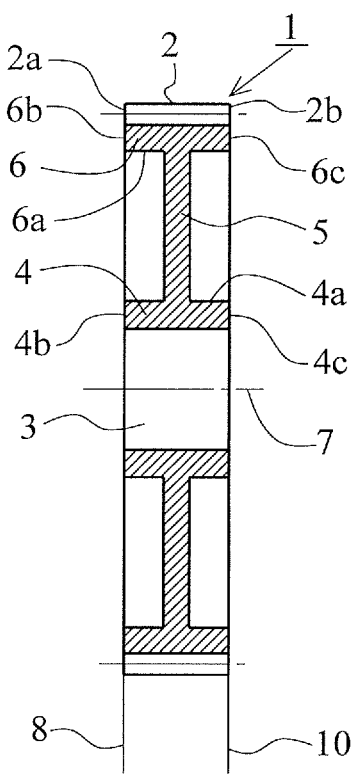
Fig. 1A          Fig. 1B
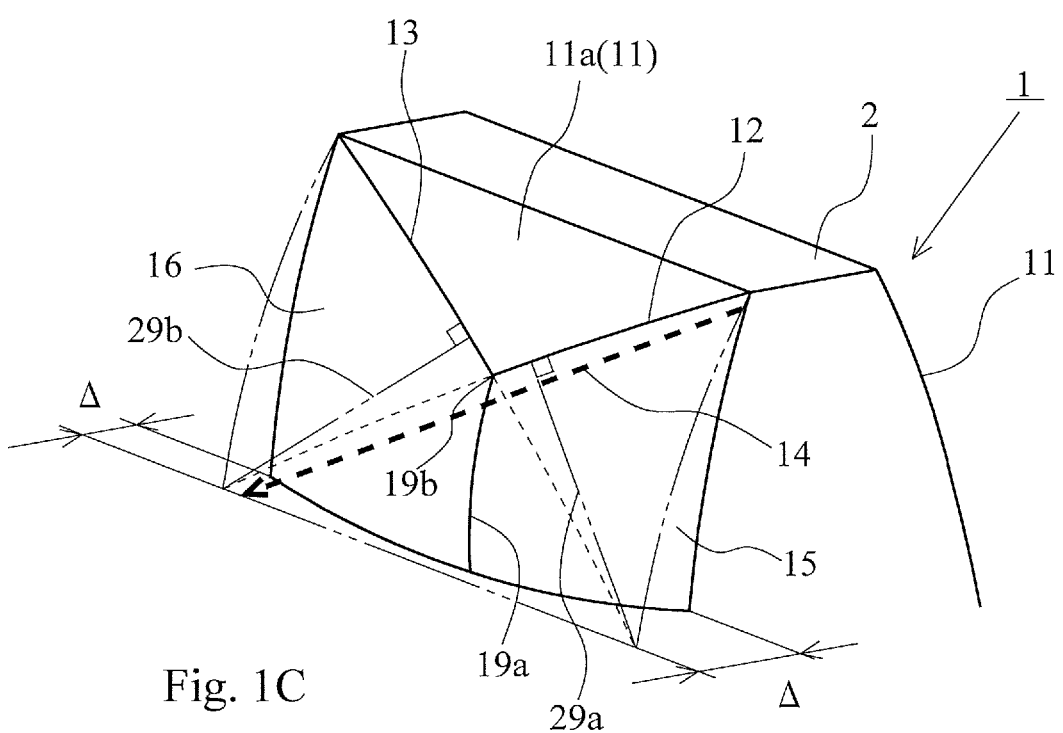
Fig. 1C

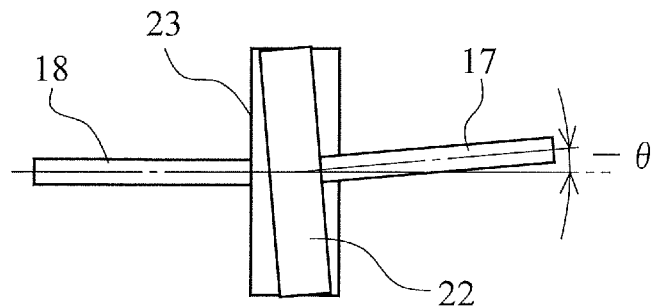
Fig. 2(A-1)
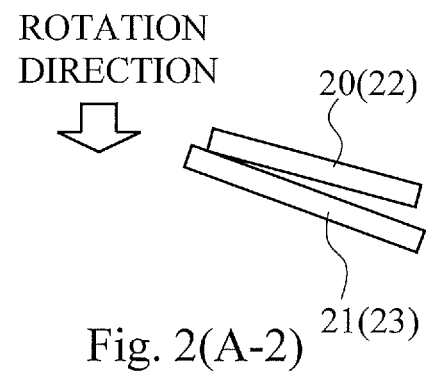
Fig. 2(A-2)
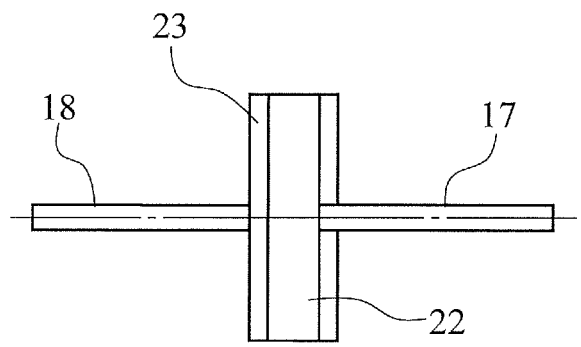
Fig. 2(B-1)
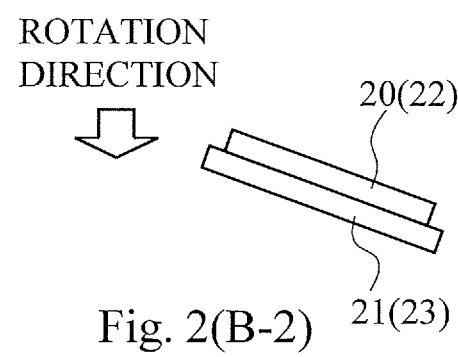
Fig. 2(B-2)
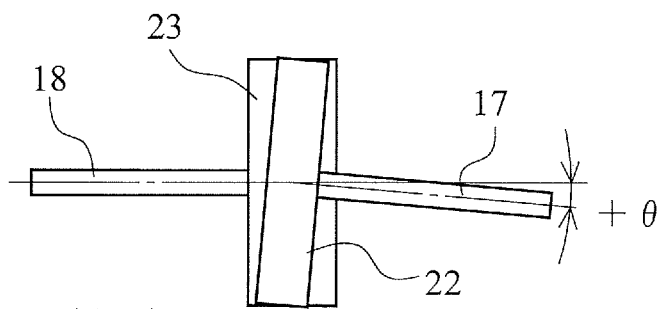
Fig. 2(C-1)
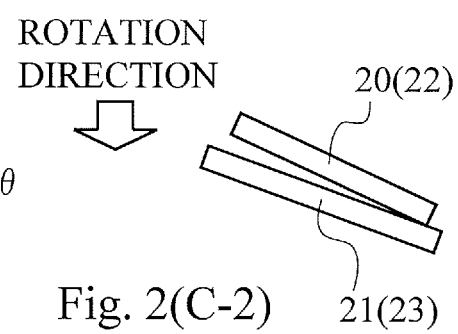
Fig. 2(C-2)

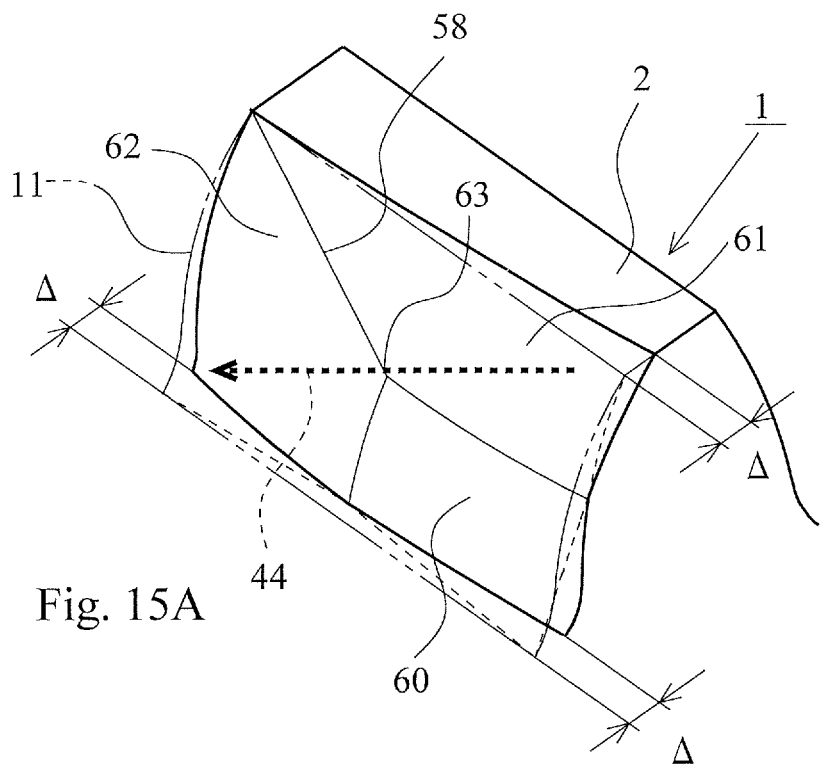
Fig. 15A
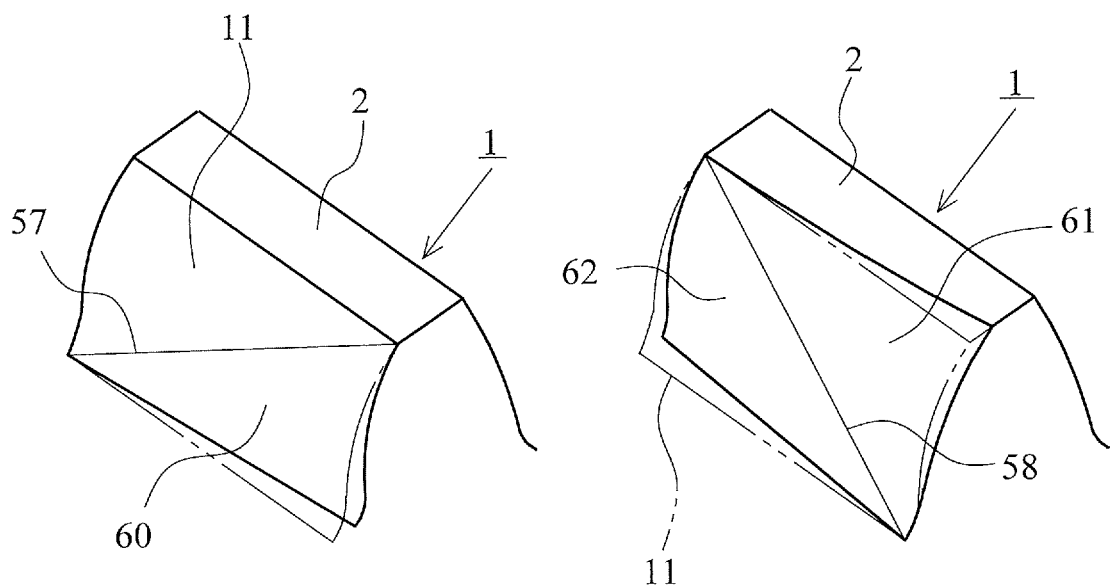
Fig. 15B
Fig. 15C

RESIN HELICAL GEAR

TECHNICAL FIELD

This invention relates to a resin helical gear used for a rotation transmission, especially relates to a resin helical gear on which a tooth-surface modification is performed for a purpose of reducing a rotation transmission error caused by a misalignment between gear shafts.

BACKGROUND ART

Conventionally, on a power transmission device that employs a helical gear, various techniques for reducing a rotation transmission error caused by a misalignment between gear shafts have been developed. For example, on a helical gear, there has been known a technique where a processing (crowning) for appropriately bulging in a tooth trace direction is performed to concentrate a tooth contact on a center of a tooth width so as to reduce the rotation transmission error caused by the misalignment between the gear shafts (see Japanese Unexamined Patent Application Publication No. 8-197332 and especially, paragraphs 0001 to 0006, FIG. 17; and Japanese Unexamined Patent Application Publication No. 2014-89483 and especially, FIGS. 5 to 6). On the helical gear, there has been known a technique where a three-dimensional tooth-surface modification (a bias-out tooth-surface modification or a bias-in tooth-surface modification) is performed on a tooth surface to reduce the rotation transmission error caused by the misalignment between the gear shafts (see Japanese Unexamined Patent Application Publication No. 10-89442 and especially, FIG. 1 and FIG. 8; and Japanese Unexamined Patent Application Publication No. 2008-275060 and especially, FIG. 8 and FIG. 11).

However, when the above conventional crowning, bias-out tooth-surface modification, or bias-in tooth-surface modification is performed on the tooth surface of the resin helical gear, the rotation transmission error caused by the misalignment between the gear shafts fails to be sufficiently reduced.

Therefore, the present invention provides a resin helical gear configured to reduce a rotation transmission error caused by a misalignment between gear shafts with excellent rotation transmission accuracy.

SUMMARY OF THE INVENTION

The present invention relates to a resin helical gear 1 where a three-dimensional tooth-surface modification is performed on a tooth surface 11 of a tooth 2 having an involute tooth profile form. In this invention, a first machining reference line 12 obliquely coupling a tooth tip side of the tooth 2 on one end side in a tooth width direction to a tooth root side of the tooth 2 on another end side in the tooth width direction along the tooth surface 11 and a second machining reference line 13 obliquely coupling a tooth tip side of the tooth 2 on the other end side in the tooth width direction to a tooth root side of the tooth 2 on the one end side in the tooth width direction along the tooth surface 11 are set. On the tooth surface 11, the three-dimensional tooth-surface modification is performed such that the tooth surface 11 is cut out by a smooth first curved surface 15 from the first machining reference line 12 to the tooth root of the tooth 2 on the one end side in the tooth width direction while the tooth surface 11 is cut out by a smooth second curved surface 16 from the second machining reference line 13 to the tooth root of the tooth 2 on the other end side in the tooth width direction. The three-dimensional tooth-surface modification leaves the involute tooth profile form on the tooth tip side of the tooth 2 with respect to the first machining reference line 12 and the second machining reference line 13.

Effects of the Invention

The resin helical gear according to the present invention ensures decreasing a rotation transmission error caused by a misalignment between gear shafts compared with a resin helical gear on which a conventional tooth-surface modification is performed, thus improving rotation transmission accuracy even if the misalignment between the gear shafts occurs.

BRIEF DESCRIPTION OF THE DRAWINGS

FIGS. 1A-1C are drawings illustrating a resin helical gear according to a first embodiment of the present invention. FIG. 1A is a front view of the resin helical gear according to the embodiment, FIG. 1B is a cross-sectional view of the resin helical gear taken along the line Al-Al of FIG. 1A, and FIG. 1C is a perspective view of a tooth of the resin helical gear according to the embodiment viewed obliquely from above.

FIGS. 2(A-1)-2(C-2) are drawings schematically illustrating a meshing state of teeth when a misalignment between gear shafts occurs and a meshing state of teeth when the misalignment between the gear shafts does not occur.

FIG. 15A is a perspective view illustrating a tooth of a resin helical gear according to a third embodiment of the present invention viewed obliquely from above, FIG. 15B is a first auxiliary view for explaining a shape of the tooth of FIG. 15A, and FIG. 15C is a second auxiliary view for explaining the shape of the tooth of FIG. 15A.

DESCRIPTION OF PREFERRED EMBODIMENTS

Figure 3A:
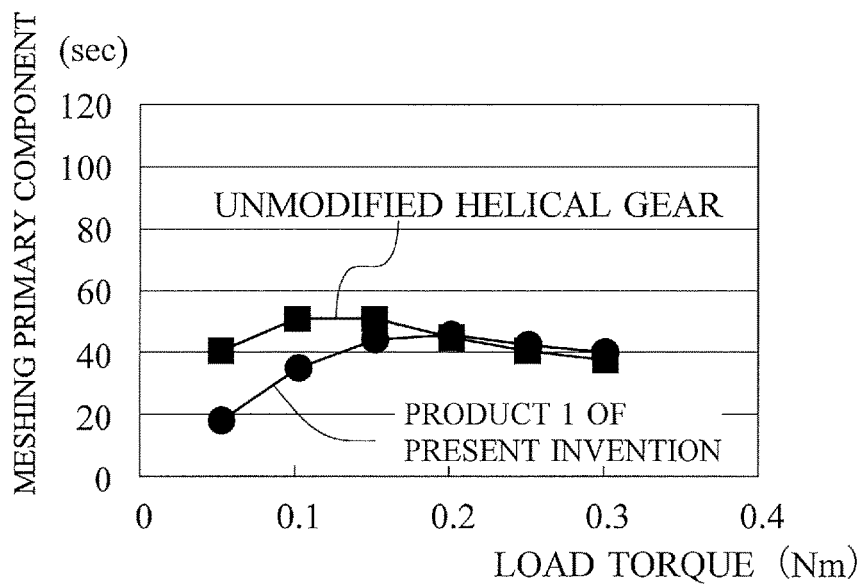
FIGS. 3A-3C are diagrams illustrating results measured in a single tooth-surface meshing test on a rotation transmission error (meshing primary component) of the resin helical gear according to the first embodiment of the present invention compared with results measured in a single tooth-surface meshing test on a rotation transmission error (meshing primary component) of an unmodified helical gear with settings of meshing states of the teeth illustrated in FIGS. 2(*a*-2), (b-2), and (c-2).

The following describes embodiments of the present invention in detail based on the drawings.

[First Embodiment]

FIGS. 1A-1C are drawings illustrating a resin helical gear 1 according to a first embodiment of the present invention. FIG. 1A is a front view of the resin helical gear 1 according to the embodiment. FIG. 1B is a cross-sectional view of the resin helical gear 1 taken along the line Al-Al of FIG. 1A. FIG. 1C is a perspective view of a tooth 2 of the resin helical gear 1 according to the embodiment viewed obliquely from above.

As illustrated in FIGS. 1A-1C, the resin helical gear 1 includes a cylindrical boss 4 that includes a shaft hole 3 to which a shaft fits, a disc-shaped web 5 that extends from an outer peripheral surface 4a of the boss 4 to an outside in a radial direction, a cylindrical rim 6 disposed on an outer peripheral end of the web 5, and a plurality of the teeth 2 disposed on an outer peripheral side of the rim 6. The resin helical gear 1 includes the web 5, which couples the outer peripheral surface 4a of the boss 4 to an inner peripheral surface 6a of the rim 6, on a center along a central axis 7 of the boss 4. The resin helical gear 1 is configured to have one side surface 4b (left side surface in FIG. 1B) of the boss 4, one side surface 6b (left side surface in FIG. 1B) of the rim 6, and one end surface 2a (left side end surface in FIG. 1B) of the tooth 2 in a tooth width direction on a first virtual plane 8 perpendicular to the central axis 7. The resin helical gear 1 is configured to have another side surface 4c (right side surface in FIG. 1B) of the boss 4, another side surface 6c (right side surface in FIG. 1B) of the rim 6, and another end surface 2b (right side end surface in FIG. 1B) of the tooth 2 in the tooth width direction on a second virtual plane 10 perpendicular to the central axis 7 and parallel to the first virtual plane 8. Then, such resin helical gear 1 is formed using plastic such as polyacetal (POM) and polyamide (PA).

The tooth 2 of the resin helical gear 1 illustrated in FIG. 1C is formed by performing a three-dimensional tooth-surface modification on a tooth surface 11 of the tooth 2 having an involute tooth profile form. That is, in this embodiment, assuming that a line obliquely coupling a tooth tip side of the tooth 2 on one end side in the tooth width direction to a tooth root side of the tooth 2 on another end side in the tooth width direction along the tooth surface 11 is a first machining reference line 12, and a line obliquely coupling a tooth tip side of the tooth 2 on the other end side in the tooth width direction to a tooth root side of the tooth 2 on the one end side in the tooth width direction along the tooth surface 11 is a second machining reference line 13, the tooth surface 11 (one tooth surface of both tooth surfaces) used for meshing of the teeth 2 is configured to have the first machining reference line 12 disposed along a running direction 14 of a meshing contact line. Then, on the tooth surface 11, the three-dimensional tooth-surface modification is performed such that the tooth surface 11 is cut out by a smooth first curved surface 15 from the first machining reference line 12 to the tooth root of the tooth 2 on the one end side in the tooth width direction while the tooth surface 11 is cut out by a smooth second curved surface 16 from the second machining reference line 13 to the tooth root of the tooth 2 on the other end side in the tooth width direction. As a result, on the tooth surface 11, a tooth surface portion 11a (tooth surface portion having the involute tooth profile form), having a shape similar to a triangular shape, where the three-dimensional tooth-surface modification is not performed on the tooth tip side with respect to the first machining reference line 12 and the second machining reference line 13, is left. Amounts of the modifications of the tooth surface 11 of the tooth 2 are indicated by As. On thus formed (the three-dimensional tooth-surface modification is performed) tooth surface 11, a ridgeline 19a formed by the first curved surface 15 and the second curved surface 16 extends from an intersection portion 19b of the first machining reference line 12 and the second machining reference line 13 to the tooth root side along a tooth length direction. A machining direction of the first curved surface 15 is a direction along a virtual line 29a extending perpendicular to the first machining reference line 12 from the tooth root of the tooth surface 11 on the one end side in the tooth width direction. A machining direction of the second curved surface 16 is a direction along a virtual line 29b extending perpendicular to the second machining reference line 13 from the tooth root of the tooth surface 11 on the other end side in the tooth width direction.

FIGS. 2(A-1)-2(C-1) are drawings schematically illustrating a meshing state of teeth 20, 21 when a misalignment between gear shafts 17, 18 occur, and a meshing state of the teeth 20, 21 when the misalignment between the gear shafts 17, 18 does not occur. FIG. 2(A-1) illustrates a state where the gear shaft 17 of a drive side helical gear 22 is assembled to be displaced by -θ with respect to the gear shaft 18 of a driven side helical gear 23. Then, FIG. 2(a-2) illustrates a meshing state of the tooth 20 of the drive side helical gear 22 and the tooth 21 of the driven side helical gear 23 in FIG. 2(A-1). FIG. 2(B-1) illustrates a state where the gear shaft 17 of the drive side helical gear 22 is assembled without being displaced (without occurrence of the misalignment) with respect to the gear shaft 18 of the driven side helical gear 23. Then, FIG. 2(b-2) illustrates a meshing state of the tooth 20 of the drive side helical gear 22 and the tooth 21 of the driven side helical gear 23 in FIG. 2(B-1). FIG. 2(C-1) illustrates a state where the gear shaft 17 of the drive side helical gear 22 is assembled to be displaced by +θ with respect to the gear shaft 18 of the driven side helical gear 23. Then, FIG. 2(c-2) illustrates a meshing state of the tooth 20 of the drive side helical gear 22 and the tooth 21 of the driven side helical gear 23 in FIG. 2(C-1). FIG. 2(A-1), FIG. 2(B-1), and FIG. 2(C-1) illustrate the inclined tooth 22 on the drive side and the driven side helical gear 23 such that the tooth width of the drive side helical gear 22 is smaller than the tooth width of the driven side helical gear 23 for convenience so as to clear the difference of both helical gears.

Figure 3B:
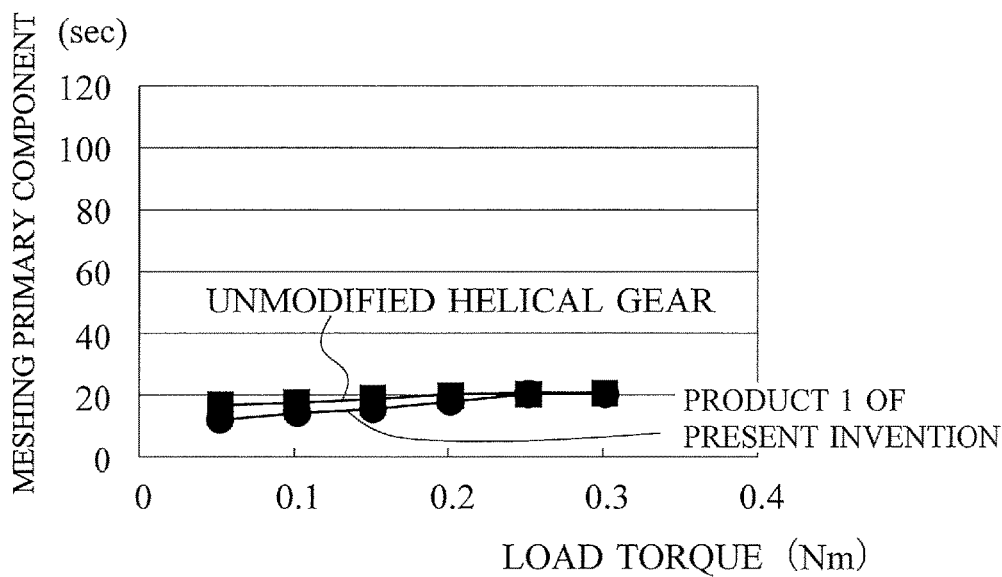
Figure 3C:
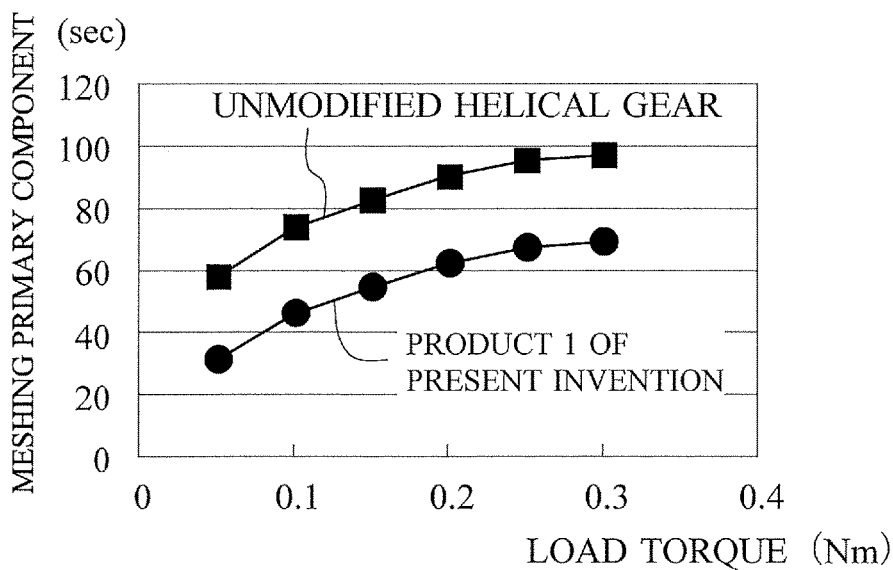

FIGS. 3A-3C are diagrams illustrating results measured in a single tooth-surface meshing test on a meshing primary component as a rotation transmission error of the resin helical gear 1 according to the embodiment compared with results measured in a single tooth-surface meshing test on a meshing primary component as a rotation transmission error of a typically used resin helical gear (unmodified helical gear) on which a tooth-surface modification is not performed with settings of the meshing states of the teeth illustrated in FIGS. 2(a-2), (b-2), and (c-2). FIG. 3A is a diagram illustrating a result of the single tooth-surface meshing test (first meshing test) in the meshing state of the teeth in FIG. 2(a-2). FIG. 3B is a diagram illustrating a result of the single tooth-surface meshing test (second meshing test) in the meshing state of the teeth in FIG. 2(b-2). FIG. 3C is a diagram illustrating a result of the single tooth-surface meshing test (third meshing test) in the meshing state of the teeth in FIG. 2(c-2). In FIGS. 3A to C, the resin helical gear 1 according to the embodiment is indicated as a product 1 of the present invention. In FIGS. 3A to C, a horizontal axis indicates a load torque (Nm), and a vertical axis indicates a meshing primary component (sec) of the rotation transmission error. In the following description, the meshing primary component as the rotation transmission error is abbreviated as a rotation transmission error as necessary.

The single tooth-surface meshing test is performed using a single tooth-surface meshing testing machine (MEATA-4) made by Ogasawara Precision Laboratory Ltd. The gear specifications of the drive side helical gear 22 and the driven side helical gear 23, which are used for the single tooth-surface meshing test, include a tooth count (Z) 36, a module (in) 0.7, a pressure angle (α) 20°, a helix angle (β) 20°, a tooth width 7 mm, and full depth tooth. Alignment errors (θs indicated in FIG. 2A and FIG. 2C) of the gear shafts 17, 18 are configured to be 0.5° considering conditions where the resin helical gear 1 according to the embodiment is used. The single tooth-surface meshing test is performed by applying the load torque of 0.05 Nm to 0.3 Nm considering the conditions where the resin helical gear 1 according to the embodiment is used. Then, for the drive side helical gear 22 having a standard tooth profile (involute tooth profile), a metal (brass) helical gear is used. For the driven side helical gear 23, any of an unmodified helical gear (not illustrated) made of resin (POM (equivalent to M25)) as a standard for judging the rotation transmission error good or bad, the resin (POM (equivalent to M25)) helical gear 1 according to the embodiment, or resin (POM (equivalent to M25)) helical gears 24 to 27 according to first to fourth comparative examples described later is used. Since the single tooth-surface meshing testing machine is not configured to add the alignment error of the gear shafts 17, 18 (because of a structure where the gear shaft 17 of the drive side helical gear 22 cannot be installed on the gear shaft 18 of the driven side helical gear 23 in a state of being inclined), the reference drive side helical gear ($\beta=20°$) 22 is changed to a drive side helical gear 22 with the helix angle ($\beta$) of the tooth 20 of 19.5° so as to configure the meshing state illustrated in FIG. 2(*a*-2), and the reference drive side helical gear ($\beta=20°$) 22 is changed to a drive side helical gear with the helix angle ($\beta$) of the tooth 20 of 20.5° so as to configure the meshing state illustrated in FIG. 2(*c*-2). The single tooth-surface meshing testing machine has a center distance between the gear shaft 17 of the drive side helical gear 22 and the gear shaft 18 of the driven side helical gear 23 during the test to be a distance obtained by adding 0.25 mm for securing a backlash to a theoretical center distance. The resin helical gear 1 according to the embodiment used for the single tooth-surface meshing test is configured to have a modification amount Δ of the tooth surface 11 of 20 μm. Here, POM (M25) indicates a grade M25 of a product name "Duracon" (registered trademark) made by Polyplastics Co., Ltd.

According to the result of the first meshing test illustrated in FIG. 3A, the product 1 of the present invention has values of the rotation transmission error that is small compared with the unmodified helical gear or approximately similar to the unmodified helical gear. According to the result of the second meshing test illustrated in FIG. 3B, the product 1 of the present invention has values of the rotation transmission error that is small compared with the unmodified helical gear or similar to the unmodified helical gear. Moreover, compared with the result of the first meshing test, the product 1 of the present invention indicates values of the rotation transmission error more approaching the unmodified helical gear, and the rotation transmission error includes extremely small values and a small variation width. According to the result of the third meshing test illustrated in FIG. 3C, the product 1 of the present invention has the rotation transmission error significantly decreased compared with the unmodified helical gear. This ensures the product 1 of the present invention to have the rotation transmission error constantly decreased compared with the standardly used unmodified helical gear irrespective of the direction of the misalignment.

Figure 4A:
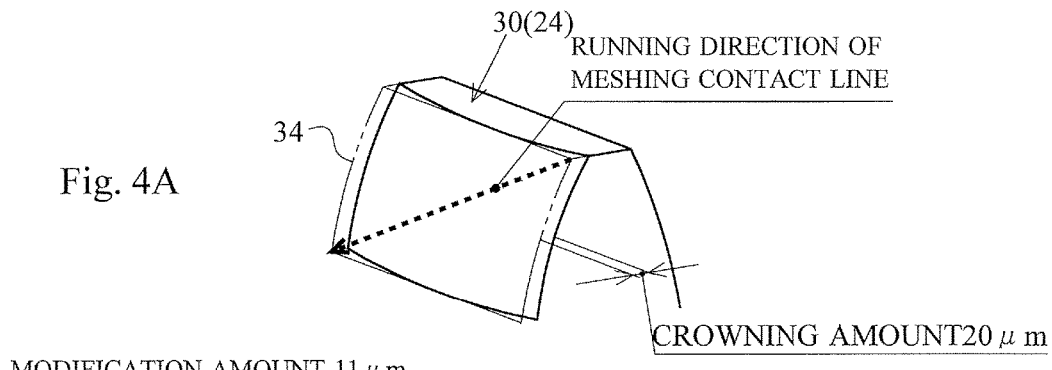
FIG. 4A is an external perspective view of a tooth of a resin helical gear according to a first comparative example.
Figure 4B:
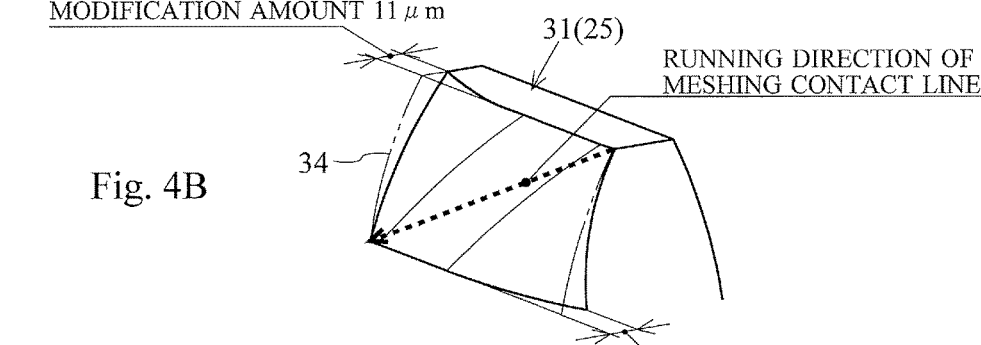
FIG. 4B is an external perspective view of a tooth of a resin helical gear according to a second comparative example.
Figure 4C:
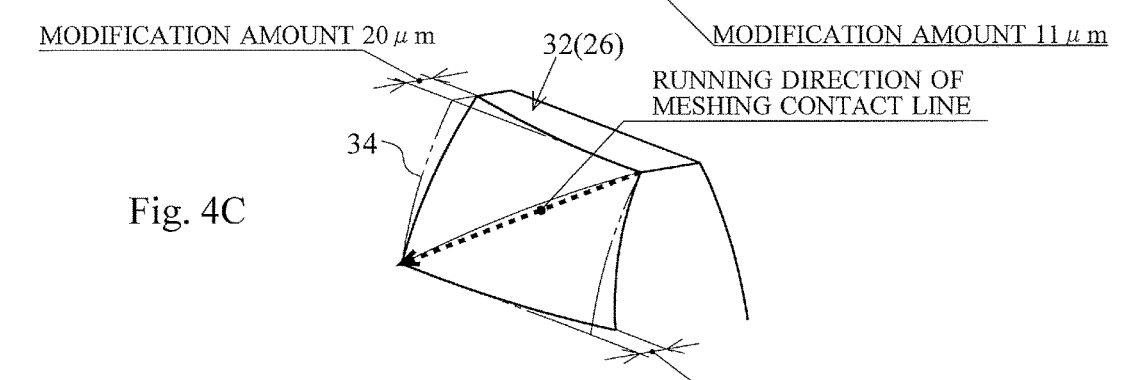
FIG. 4C is an external perspective view of a tooth of a resin helical gear according to a third comparative example.
Figure 4D:
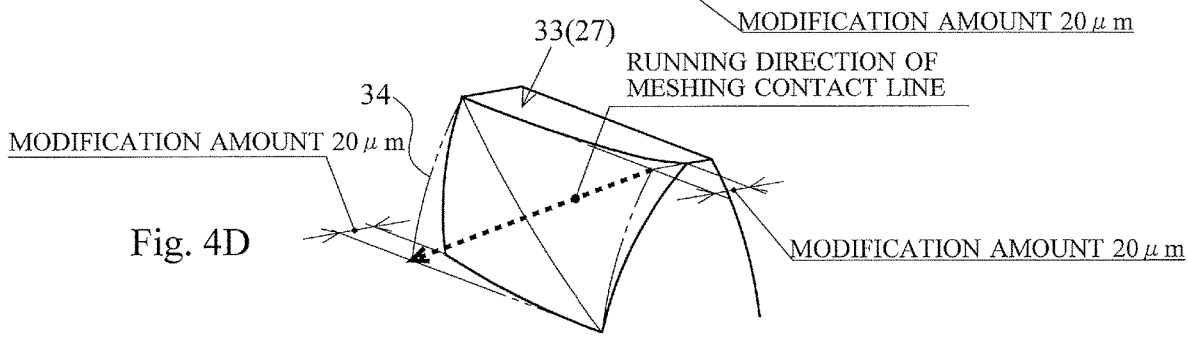
FIG. 4D is an external perspective view of a tooth of a resin helical gear according to a fourth comparative example.

FIGS. 4A-4D are drawings illustrating teeth 30 to 33 of the resin helical gears 24 to 27 according to the first to fourth comparative examples. FIG. 4A is an external perspective view of the tooth 30 of the resin helical gear 24 according to the first comparative example where a crowning is performed on a tooth surface 34. FIG. 4B is an external perspective view of the tooth 31 of the resin helical gear 25 according to the second comparative example where a bias-in tooth-surface modification is performed on a part of the tooth surface 34. FIG. 4C is an external perspective view of the tooth 32 of the resin helical gear 26 according to the third comparative example where the bias-in tooth-surface modification is performed on the whole tooth surface 34. FIG. 4D is an external perspective view of the tooth 33 of the resin helical gear 27 according to the fourth comparative example where a bias-out tooth-surface modification is performed on the tooth surface 34.

Figure 5A:
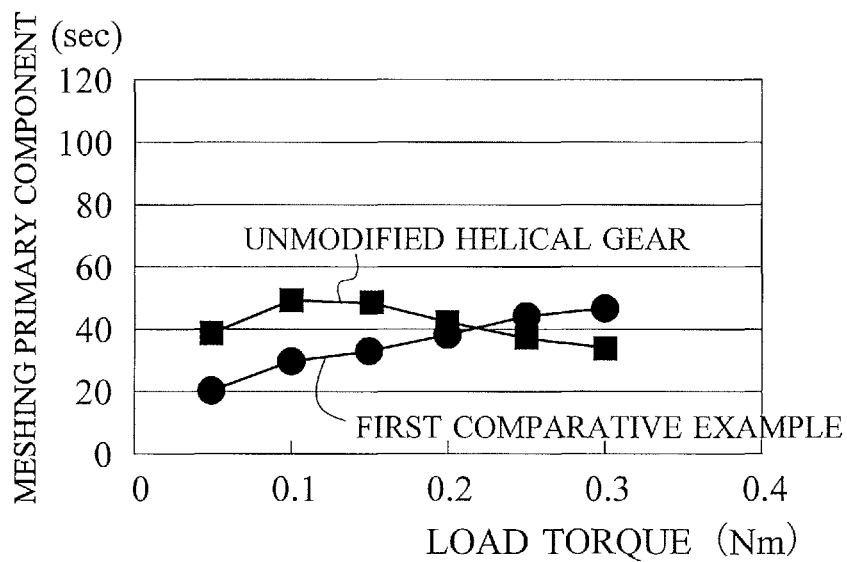
FIGS. 5A-5C are diagrams illustrating results measured in a single tooth-surface meshing test on a rotation transmission error (meshing primary component) of the resin helical gear according to the first comparative example compared with the results measured in the single tooth-surface meshing test on the rotation transmission error (meshing primary component) of the unmodified helical gear with the settings of the meshing states of the teeth illustrated in FIGS. 2(*a*-2), (b-2), and (c-2).
Figure 5B:
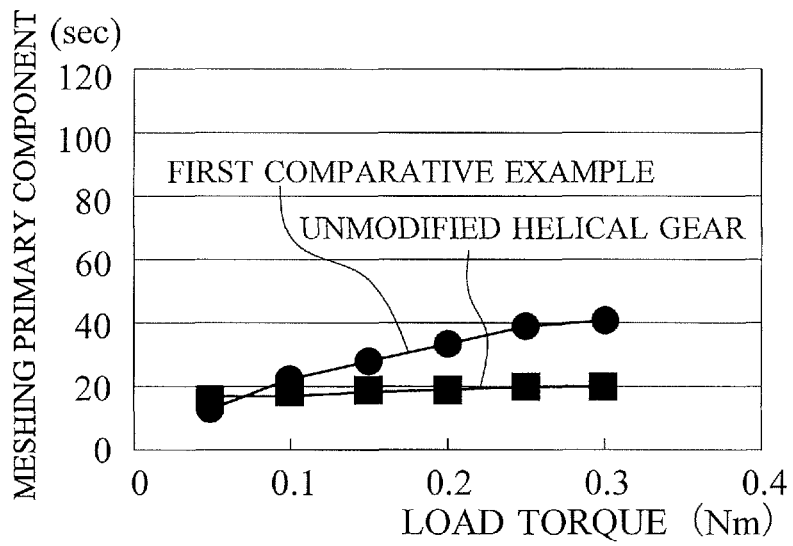
Figure 5C:
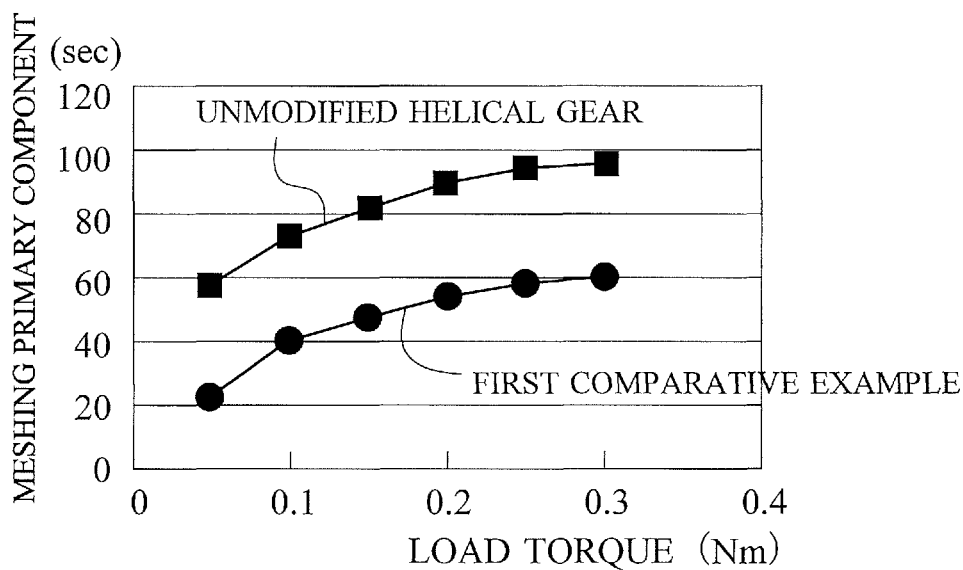

FIGS. 5A-5C are diagrams illustrating results measured in the single tooth-surface meshing test on the rotation transmission error of the resin helical gear 24 according to the first comparative example compared with the results measured in the single tooth-surface meshing test on the rotation transmission error of the unmodified helical gear with the settings of the meshing states of the teeth illustrated in FIGS. 2(*a*-2), (*b*-2), and (*c*-2). FIG. 5A is a diagram illustrating a result of the first meshing test. FIG. 5B is a diagram illustrating a result of the second meshing test. FIG. 5C is a diagram illustrating a result of the third meshing test. In FIG. 5, the resin helical gear 24 according to the first comparative example is indicated as the first comparative example.

According to the result of the first meshing test illustrated in FIG. 5A, the first comparative example has the rotation transmission error increased compared with the unmodified helical gear in a range where the load torque exceeds 0.2 (Nm). According to the result of the second meshing test illustrated in FIG. 5B, the first comparative example has the rotation transmission error increased compared with the unmodified helical gear when the load torque becomes 0.1 (Nm) or more. According to the result of the third meshing test illustrated in FIG. 5C, the first comparative example has the rotation transmission error significantly decreased compared with the unmodified helical gear.

Figure 6A:
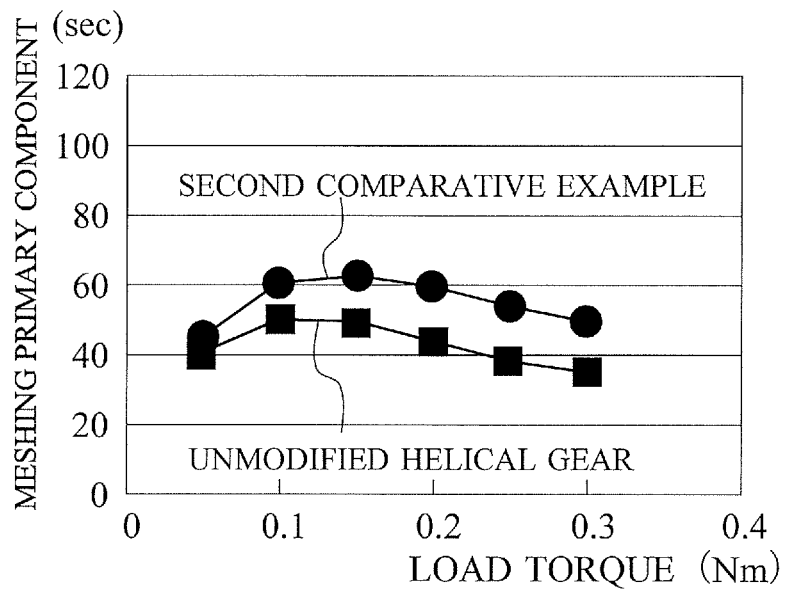
FIGS. 6A-6C are diagrams illustrating results measured in a single tooth-surface meshing test on a rotation transmission error (meshing primary component) of the resin helical gear according to the second comparative example compared with the results measured in the single tooth-surface meshing test on the rotation transmission error (meshing primary component) of the unmodified helical gear with the settings of the meshing states of the teeth illustrated in FIGS. 2(*a*-2), (b-2), and (c-2).
Figure 6B:
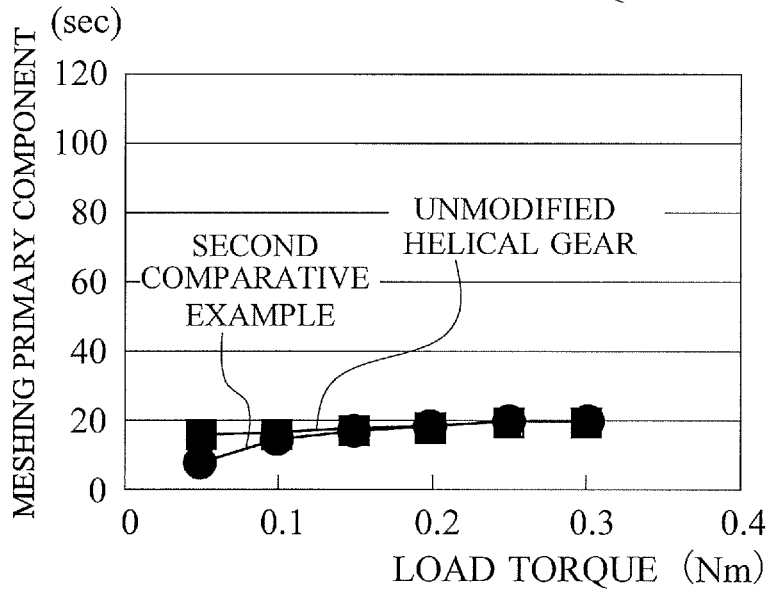
Figure 6C:
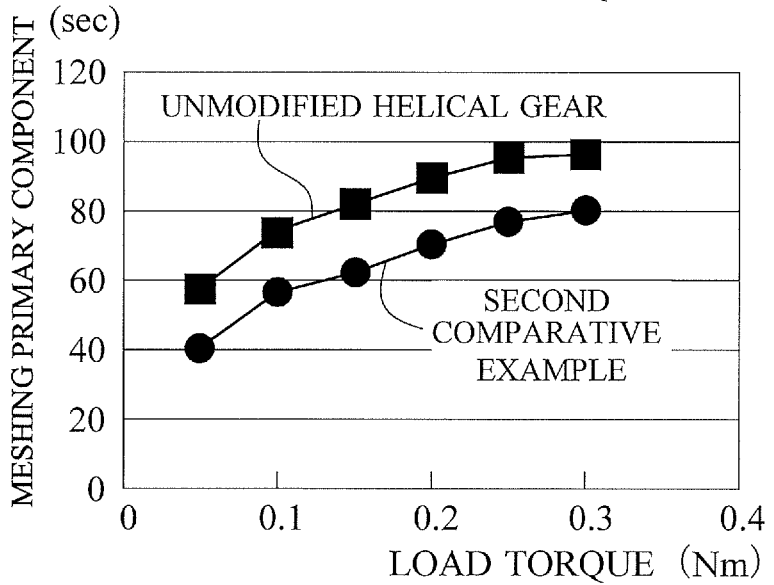

FIGS. 6A-6C are diagrams illustrating results measured in the single tooth-surface meshing test on the rotation transmission error of the resin helical gear 25 according to the second comparative example compared with the results measured in the single tooth-surface meshing test on the rotation transmission error of the unmodified helical gear with the settings of the meshing states of the teeth illustrated in FIGS. 2(*a*-2), (*b*-2), and (*c*-2). FIG. 6A is a diagram illustrating a result of the first meshing test. FIG. 6B is a diagram illustrating a result of the second meshing test. FIG. 6C is a diagram illustrating a result of the third meshing test. In FIG. 6, the resin helical gear 25 according to the second comparative example is indicated as the second comparative example.

According to the result of the first meshing test illustrated in FIG. 6A, the second comparative example has the rotation transmission error increased compared with the unmodified helical gear. According to the result of the second meshing test illustrated in FIG. 6B, the second comparative example has the rotation transmission error including values approximately similar to the unmodified helical gear. According to the result of the third meshing test illustrated in FIG. 6C, the second comparative example has the rotation transmission error significantly decreased compared with the unmodified helical gear.

Figure 7A:
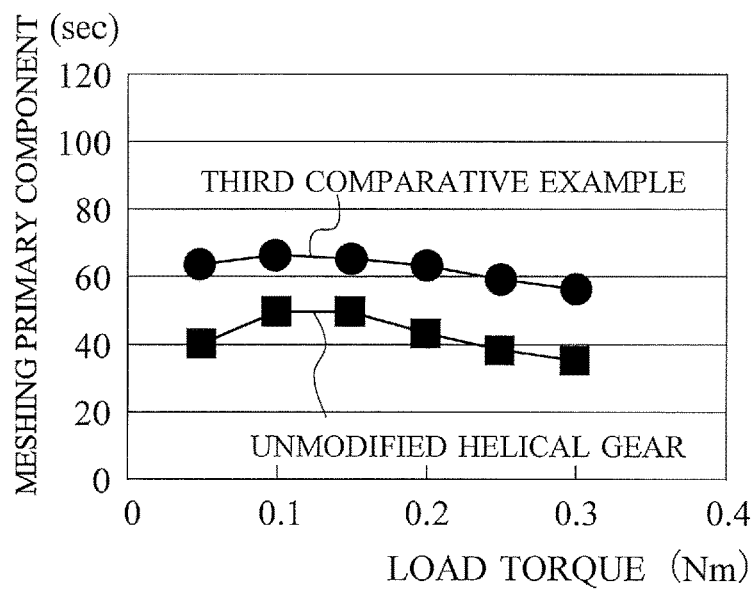
FIGS. 7A-7C are diagrams illustrating results measured in a single tooth-surface meshing test on a rotation transmission error (meshing primary component) of the resin helical gear according to the third comparative example compared with the results measured in the single tooth-surface meshing test on the rotation transmission error (meshing primary component) of the unmodified helical gear with the settings of the meshing states of the teeth illustrated in FIGS. 2(a-2), (b-2), and (c-2).
Figure 7B:
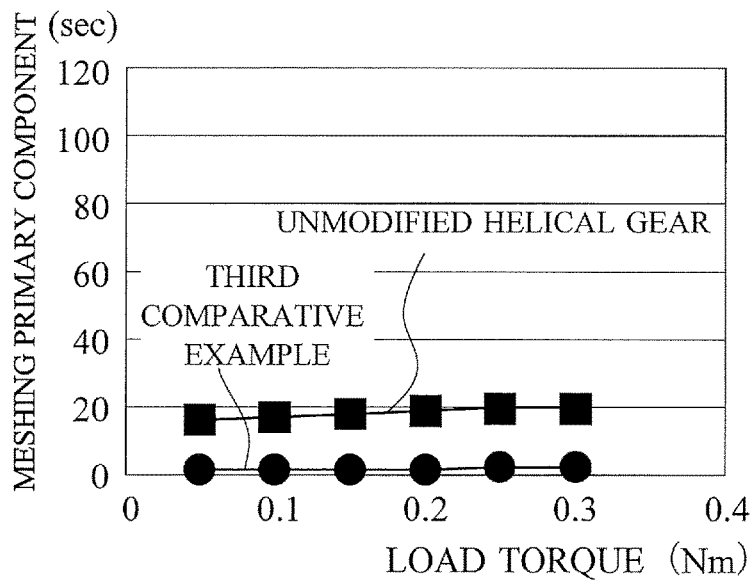
Figure 7C:
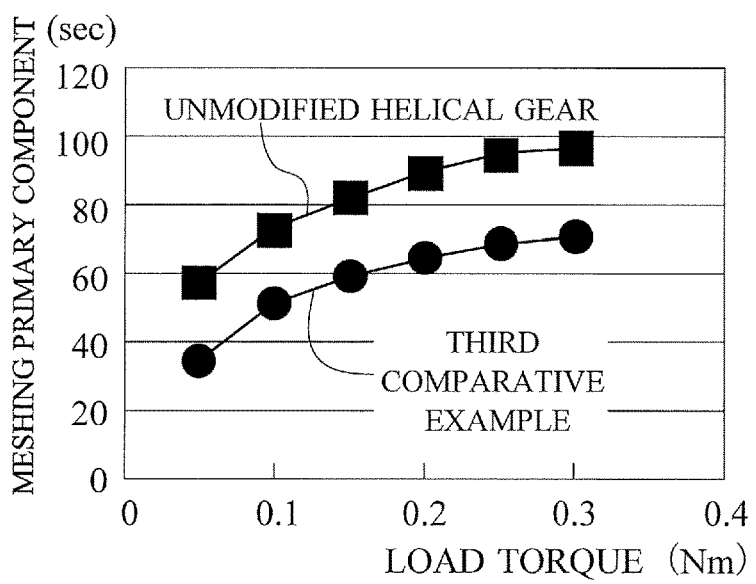

FIGS. 7A-7C are diagrams illustrating results measured in the single tooth-surface meshing test on the rotation transmission error of the resin helical gear 26 according to the third comparative example compared with the results measured in the single tooth-surface meshing test on the rotation transmission error of the unmodified helical gear with the settings of the meshing states of the teeth illustrated in FIGS. 2(*a*-2), (*b*-2), and (*c*-2). FIG. 7A is a diagram illustrating a result of the first meshing test. FIG. 7B is a diagram illustrating a result of the second meshing test. FIG. 7C is a diagram illustrating a result of the third meshing test. In FIG. 7, the resin helical gear 26 according to the third comparative example is indicated as the third comparative example.

According to the result of the first meshing test illustrated in FIG. 7A, the third comparative example has the rotation transmission error increased compared with the unmodified helical gear. According to the result of the second meshing test illustrated in FIG. 7B, the third comparative example has the rotation transmission error significantly decreased compared with the unmodified helical gear. According to the result of the third meshing test illustrated in FIG. 7C, the third comparative example has the rotation transmission error significantly decreased compared with the unmodified helical gear.

Figure 8A:
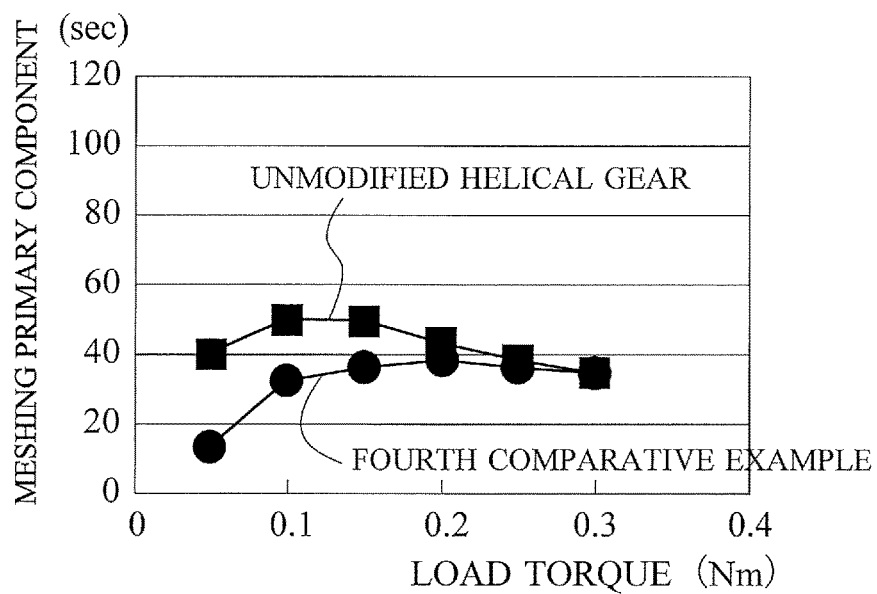
FIGS. 8A-8C are diagrams illustrating results measured in a single tooth-surface meshing test on a rotation transmission error (meshing primary component) of the resin helical gear according to the fourth comparative example compared with the results measured in the single tooth-surface meshing test on the rotation transmission error (meshing primary component) of the unmodified helical gear with the settings of the meshing states of the teeth illustrated in FIGS. 2(a-2), (b-2), and (c-2).
Figure 8B:
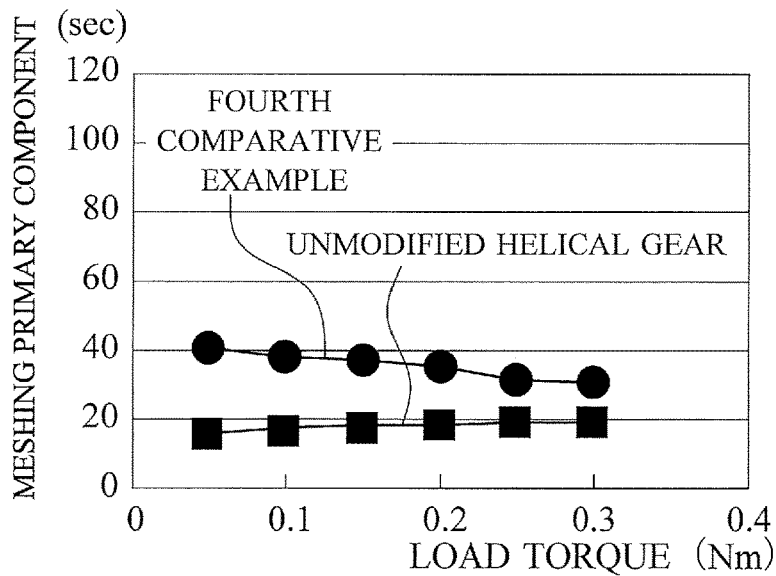
Figure 8C:
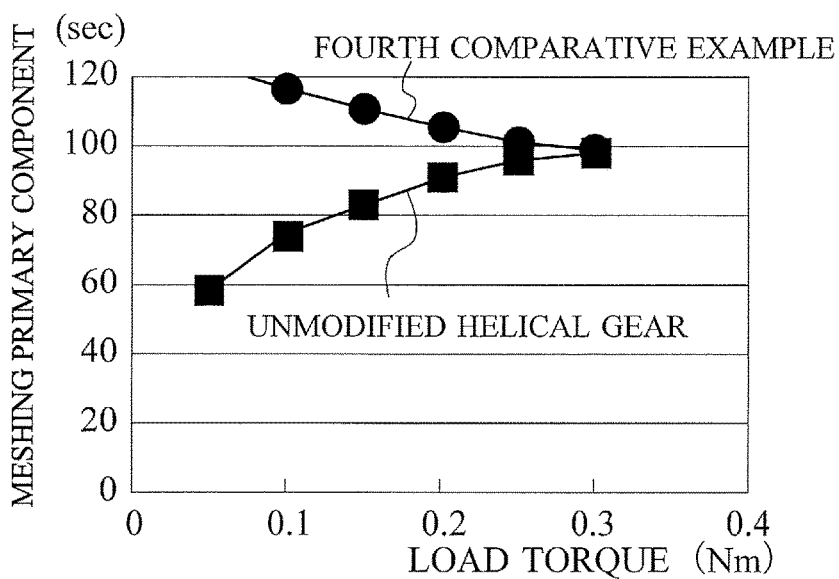

FIGS. 8A-8C are diagrams illustrating results measured in the single tooth-surface meshing test on the rotation transmission error of the resin helical gear 27 according to the fourth comparative example compared with the results measured in the single tooth-surface meshing test on the rotation transmission error of the unmodified helical gear with the settings of the meshing states of the teeth illustrated in FIGS. 2(a-2), (b-2), and (c-2). FIG. 8A is a diagram illustrating a result of the first meshing test. FIG. 8B is a diagram illustrating a result of the second meshing test. FIG. 8C is a diagram illustrating a result of the third meshing test. In FIG. 8, the resin helical gear 27 according to the fourth comparative example is indicated as the fourth comparative example.

According to the result of the first meshing test illustrated in FIG. 8A, the fourth comparative example has the rotation transmission error decreased compared with the unmodified helical gear. According to the result of the second meshing test illustrated in FIG. 8B, the fourth comparative example has the rotation transmission error increased compared with the unmodified helical gear. According to the result of the third meshing test illustrated in FIG. 8C, the fourth comparative example has the rotation transmission error significantly worsened (increased) compared with the unmodified helical gear.

A table 1 below indicates the results of the single tooth-surface meshing tests (first to third meshing tests) of measurement target products (product 1 of the present invention, first to fourth comparative examples). In the table 1, "GOOD" marks indicate cases (good cases) where the measurement target products have the rotation transmission errors equivalent or decreased compared with the rotation transmission error of the unmodified helical gear. "POOR" marks indicate cases (bad cases) where the measurement target products have the rotation transmission errors increased compared with the rotation transmission error of the unmodified helical gear.

TABLE 1

|  | FIRST MESHING TEST | SECOND MESHING TEST | THIRD MESHING TEST |
| --- | --- | --- | --- |
| PRODUCT 1 OF PRESENT INVENTION | GOOD | GOOD | GOOD |
| FIRST COMPARATIVE EXAMPLE | POOR | POOR | GOOD |
| SECOND COMPARATIVE EXAMPLE | POOR | GOOD | GOOD |
| THIRD COMPARATIVE EXAMPLE | POOR | GOOD | GOOD |
| FOURTH COMPARATIVE EXAMPLE | GOOD | POOR | POOR |

As shown in the table 1, the product 1 of the present invention has the rotation transmission error improved (in a state indicated by the "GOOD" marks) compared with the rotation transmission error of the unmodified helical gear in all the results of the first to third meshing tests). On contrast to such product 1 of the present invention, the first to fourth comparative examples have the rotation transmission errors worsened (in a state indicated by the "POOR" marks) compared with the rotation transmission error of the unmodified helical gear in at least one of the results of the first to third meshing tests. Thus, the product 1 of the present invention ensures decreasing the rotation transmission error compared with the typically used unmodified helical gear and the first to fourth comparative examples irrespective of the direction of the misalignment.

(Efficiency of This Embodiment)

As apparent from the above description, the resin helical gear 1 according to the embodiment ensures the rotation transmission error caused by the misalignment between the gear shafts 17, 18 to be decreased compared with the unmodified helical gear and the resin helical gears (first to fourth comparative examples) 24 to 27 on which the conventional tooth-surface modification is performed, thus improving a rotation transmission accuracy even when the misalignment between the gear shafts 17, 18 occurs.

(Modification 1 of First Embodiment)

Figure 9A:
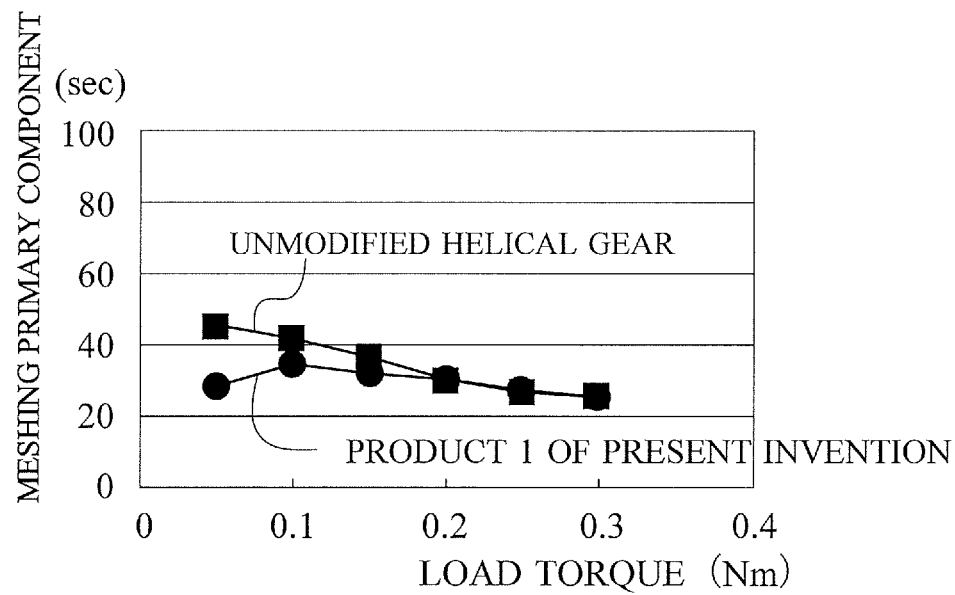
FIGS. 9A and 9B are diagrams illustrating measurement results of the rotation transmission error (meshing primary component) of the resin helical gear according to the first embodiment compared with measurement results of the rotation transmission error (meshing primary component) of the unmodified helical gear in a state where a metal (brass) helical gear is changed to a resin (POM (equivalent to M25)) helical gear on a drive side and the misalignments between the gear shafts illustrated in FIG. 2(A-1) and FIG. 2(C-1) occur.
Figure 9B:
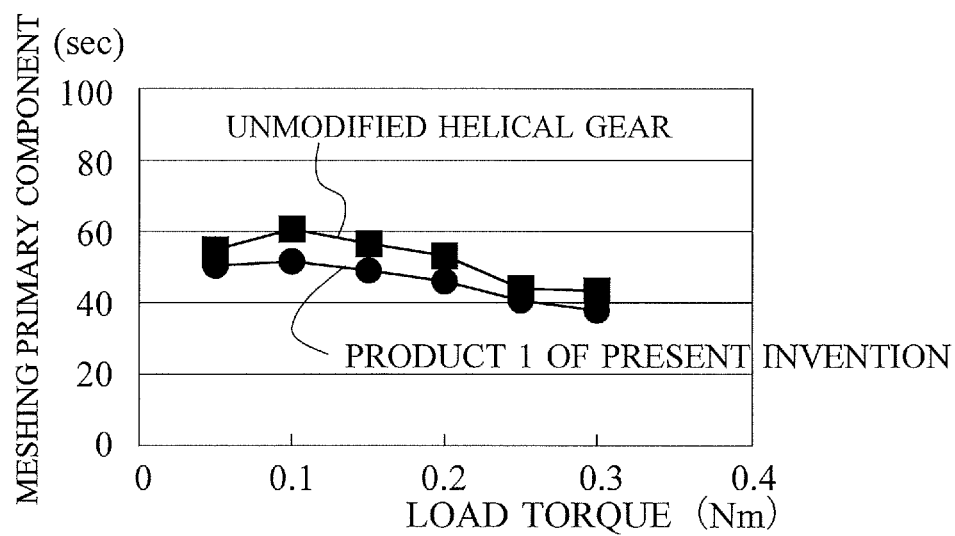

FIGS. 9A and 9B are diagrams illustrating measurement results of the rotation transmission error of the resin helical gear 1 according to the first embodiment compared with measurement results of the rotation transmission error of the unmodified helical gear in a state where the drive side gear employs a resin (POM (equivalent to M25)) helical gear instead of a metal (brass) helical gear with a standard tooth profile and the misalignments between the gear shafts illustrated in FIG. 2(A-1) and FIG. 2(C-1) occur. FIG. 9A is a diagram illustrating the measurement result of the rotation transmission error of the resin helical gear 1 according to the first embodiment compared with the measurement result of the rotation transmission error of the unmodified helical gear in a state where the misalignment between the gear shafts illustrated in FIG. 2(A-1) occurs. FIG. 9B is a diagram illustrating the measurement result of the rotation transmission error of the resin helical gear 1 according to the first embodiment compared with the measurement result of the rotation transmission error of the unmodified helical gear in a state where the misalignment between the gear shafts illustrated in FIG. 2(C-1) occurs.

As illustrated in FIGS. 9A and 9B, when the resin helical gear 1 according to the first embodiment is used in a state where the misalignments between the gear shafts illustrated in FIG. 2(A-1) and FIG. 2(C-1) occur, the rotation transmission error is equivalent to the unmodified helical gear or decreased even if the drive side gear with the standard tooth profile is the resin (POM (equivalent to M25)) helical gear. That is, when the resin helical gear 1 according to the first embodiment is used in a state where the misalignment between the gear shafts occurs, the rotation transmission accuracy can be improved even if the drive side helical gear is the resin (POM (equivalent to M25)) helical gear.

(Modification 2 of First Embodiment)

While the resin helical gear 1 according to the first embodiment is configured such that the three-dimensional tooth-surface modification is performed on one tooth surface of both tooth surfaces, not limiting to this, the three-dimensional tooth-surface modification may be performed on both tooth surfaces so as to decrease the rotation transmission errors in both forward and reverse directions in the case where the misalignment between the gear shafts occurs.

(Modification 3 of First Embodiment)

The resin helical gear 1 according to the first embodiment may include the first machining reference line 12 and the second machining reference line 13 configured such that the intersection portion 19b of the first machining reference line 12 and the second machining reference line 13 on the tooth surface 11 is positioned closer to the tooth root with respect to the position illustrated in FIG. 1C. This configuration causes the resin helical gear 1 to have the first machining reference line 12 lying along the running direction 14 of the meshing contact line with a lengthened length. The resin helical gear 1 according to the first embodiment may include the first machining reference line 12 and the second machining reference line 13 configured such that the intersection portion 19*b* of the first machining reference line 12 and the second machining reference line 13 on the tooth surface 11 is positioned closer to the tooth tip with respect to the position illustrated in FIG. 1C. This configuration causes the resin helical gear 1 to have the first machining reference line 12 lying along the running direction 14 of the meshing contact line with a shortened length.

(Modification 4 of First Embodiment)

Figure 10A:
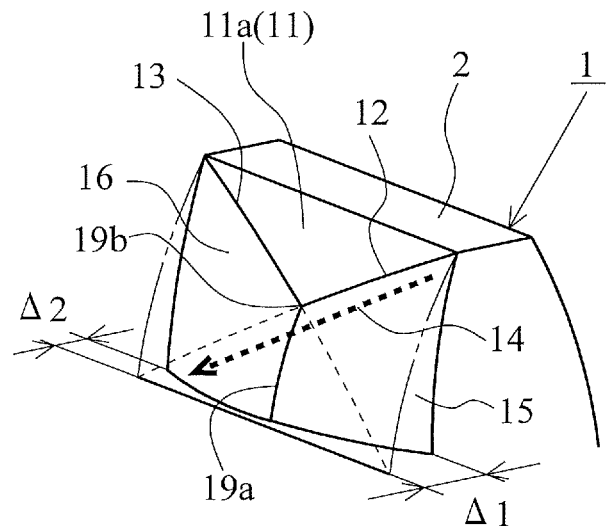
FIGS. 10A and 10B are external perspective views of a tooth of a resin helical gear according to a modification 4 of the first embodiment.
Figure 10B:
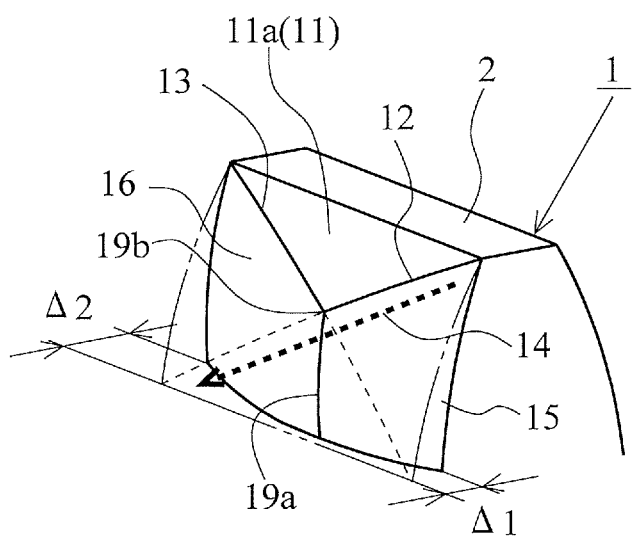

While the resin helical gear 1 according to the first embodiment has the modification amount of the tooth surface 11 so as to be equally A on the first curved surface 15 side and the second curved surface 16 side, a modification amount A1 of the tooth surface 11 on the first curved surface 15 side may be increased compared with a modification amount A2 of the tooth surface 11 on the second curved surface 16 side (see FIG. 10A), or the modification amount A2 of the tooth surface 11 on the second curved surface 16 side may be increased compared with the modification amount A1 of the tooth surface 11 on the first curved surface 15 side (see FIG. 10B) corresponding to a degree of the misalignment (magnitude of θ), thus decreasing the rotation transmission error.

[Second Embodiment]

Figure 11A:
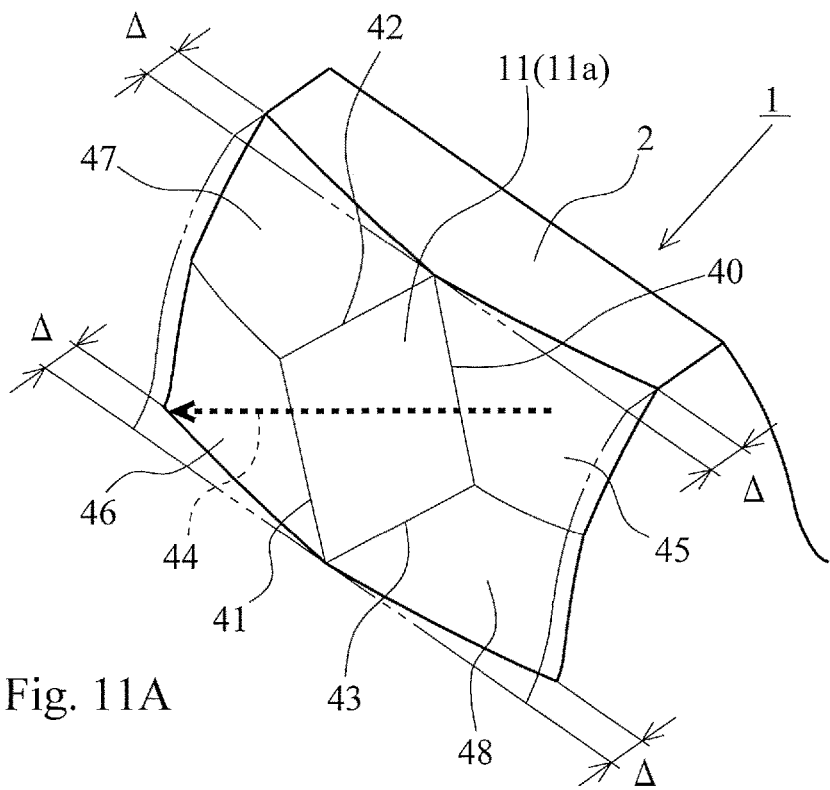
FIG. 11A is a perspective view illustrating a tooth of a resin helical gear according to a second embodiment of the present invention viewed obliquely from above.
Figure 11B:
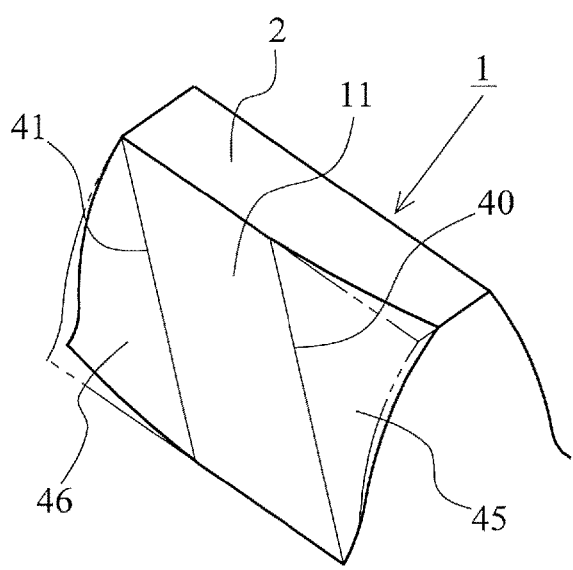
FIG. 11B is a first auxiliary view for explaining a shape of the tooth of FIG. 11A.
Figure 11C:
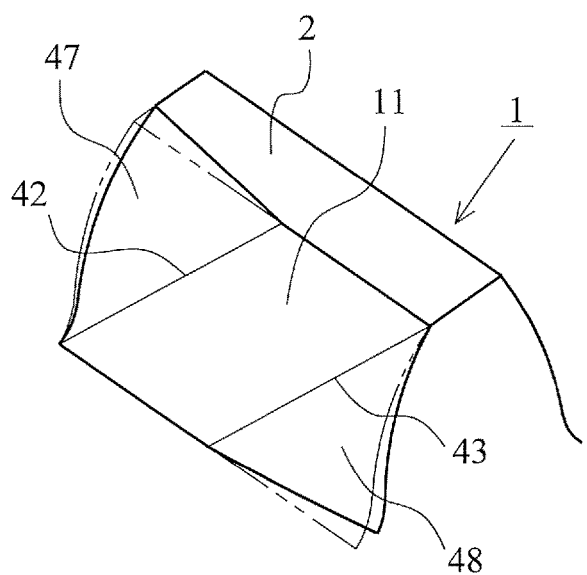
FIG. 11C is a second auxiliary view for explaining the shape of the tooth of FIG. 11A.

FIG. 11A is a perspective view illustrating a tooth 2 of a resin helical gear 1 according to a second embodiment of the present invention viewed obliquely from above. FIG. 11B is a first auxiliary view for explaining a shape of the tooth 2 of FIG. 11A. FIG. 11C is a second auxiliary view for explaining the shape of the tooth 2 of FIG. 11A.

As illustrated in FIGS. 11A-11C, the tooth 2 of the resin helical gear 1 according to the embodiment is formed by performing the three-dimensional tooth-surface modification on the tooth surface 11 of the tooth 2 having the involute tooth profile form. That is, in this embodiment, while a first machining reference line 40 (see FIG. 11B) obliquely coupling a tooth tip side of the tooth 2 on a center in a tooth width direction to a tooth root side of the tooth 2 on one end side in the tooth width direction along the tooth surface 11, a second machining reference line 41 (see FIG. 11B) obliquely coupling a tooth tip side of the tooth 2 on another end side in the tooth width direction to a tooth root side of the tooth 2 on a center in the tooth width direction along the tooth surface 11, a third machining reference line 42 (see FIG. 11C) obliquely coupling the tooth tip side of the tooth 2 on the center in the tooth width direction to the tooth root side of the tooth 2 on the other end side in the tooth width direction along the tooth surface 11, and a fourth machining reference line 43 (see FIG. 11C) obliquely coupling a tooth tip side of the tooth 2 on the one end side in the tooth width direction to the tooth root side of the tooth 2 on the center in the tooth width direction along the tooth surface 11 are set, the tooth surface 11 (one tooth surface of both tooth surfaces) used for meshing of the teeth 2 has the first to fourth machining reference lines 40 to 43 as a criteria for the tooth-surface modification. In FIG. 11A, a meshing contact line 44 is configured to run from the tooth tip side of the tooth 2 on the one end side in the tooth width direction to the tooth root side of the tooth 2 on the other end side in the tooth width direction obliquely across the tooth surface 11.

Then, on the tooth surface 11, the three-dimensional tooth-surface modification is performed (see FIG. 11A) such that the tooth surface 11 is cut out by a smooth first curved surface 45 (see FIG. 11B) from the first machining reference line 40 to the tooth tip of the tooth 2 on the one end side in the tooth width direction, cut out by a smooth second curved surface 46 (see FIG. 11B) from the second machining reference line 41 to the tooth root of the tooth 2 on the other end side in the tooth width direction, cut out by a smooth third curved surface 47 (see (FIG. 11C) from the third machining reference line 42 to the tooth tip of the tooth 2 on the other end side in the tooth width direction, and cut out by a smooth fourth curved surface 48 (see FIG. 11C) from the fourth machining reference line 43 to the tooth root of the tooth 2 on the one end side in the tooth width direction. As a result, on the tooth 2, a diamond-shaped tooth surface portion 11*a* (tooth surface portion having the involute tooth profile form) where the three-dimensional tooth-surface modification is not performed on the center portion of the tooth surface 11 surrounded by the first to fourth machining reference lines 40 to 43 is left.

Figure 12A:
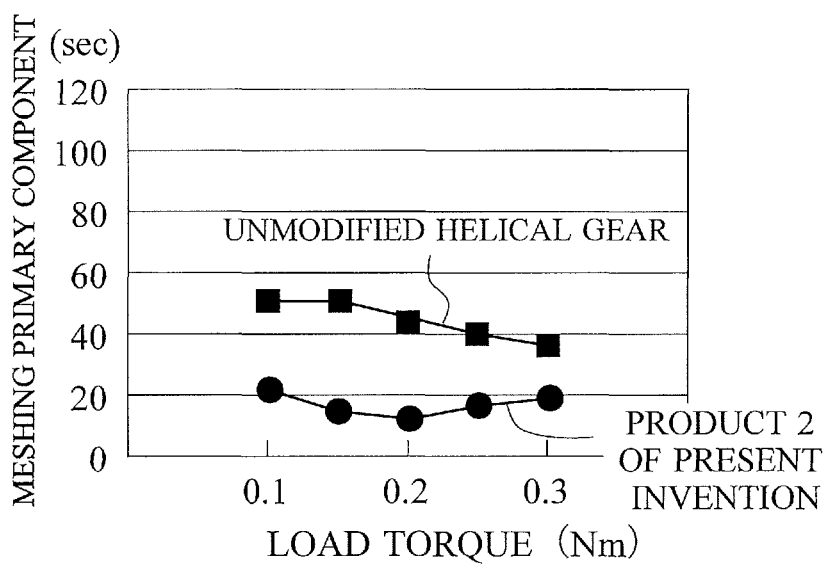
FIGS. 12A-12C are diagrams illustrating results measured in a single tooth-surface meshing test on a meshing primary component as a rotation transmission error of the resin helical gear according to the second embodiment of the present invention compared with results measured in a single tooth-surface meshing test on a meshing primary component as a rotation transmission error of a typically used resin helical gear (unmodified helical gear) on which a tooth-surface modification is not performed with the settings of the meshing states of the teeth illustrated in FIGS. 2(a-2), (b-2), and (c-2).
Figure 12B:
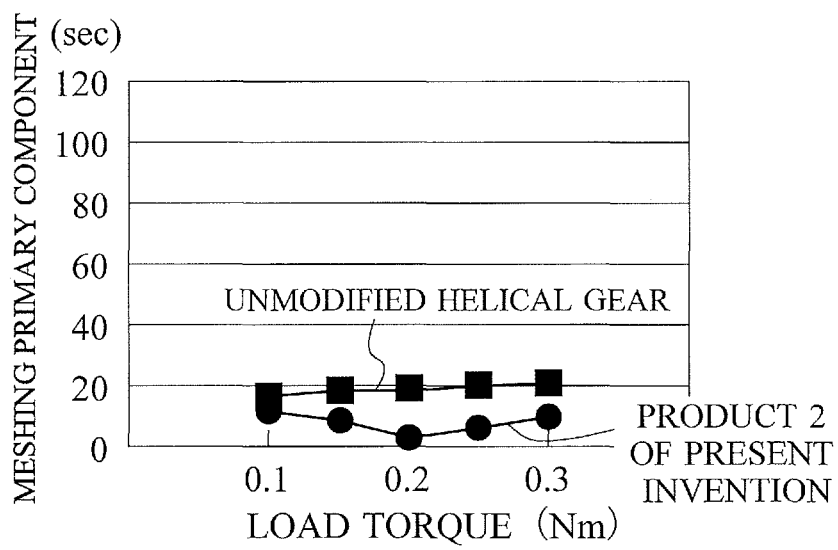
Figure 12C:
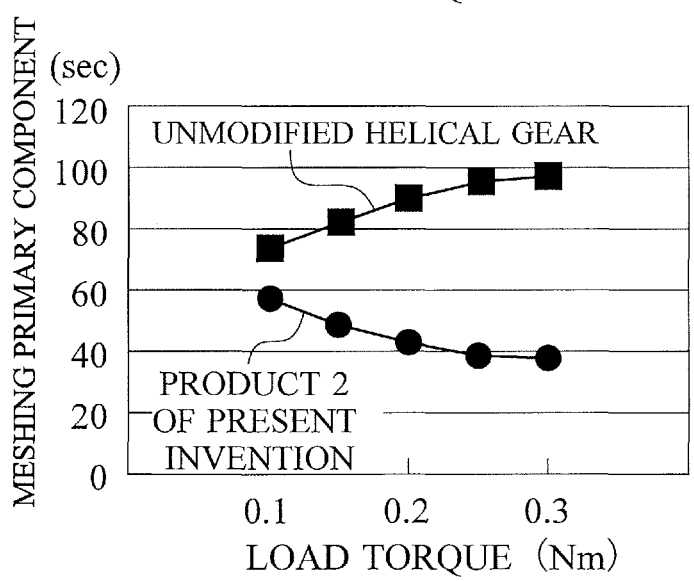

FIGS. 12A-12C are diagrams illustrating results measured in the single tooth-surface meshing test on the meshing primary component as the rotation transmission error of the resin helical gear 1 according to the embodiment compared with results measured in the single tooth-surface meshing test on the meshing primary component as the rotation transmission error of a typically used resin helical gear (unmodified helical gear) on which the tooth-surface modification is not performed with the settings of the meshing states of the teeth illustrated in FIGS. 2(*a*-2), (b-2), and (c-2). FIG. 12A is a diagram illustrating the result of the single tooth-surface meshing test (first meshing test) in the meshing state of the teeth in FIG. 2(*a*-2). FIG. 12B is a diagram illustrating the result of the single tooth-surface meshing test (second meshing test) in the meshing state of the teeth in FIG. 2(*b*-2). FIG. 12C is a diagram illustrating the result of the single tooth-surface meshing test (third meshing test) in the meshing state of the teeth in FIG. 2(*c*-2). In FIGS. 12A to C, the resin helical gear 1 according to the embodiment is indicated as a product 2 of the present invention. In FIGS. 12A to C, a horizontal axis indicates a load torque (Nm), and a vertical axis indicates a meshing primary component (sec) of the rotation transmission error. In the following description, the meshing primary component as the rotation transmission error is abbreviated as a rotation transmission error as necessary. The product 2 of the present invention has the tooth surface 11 whose modification amounts Δ are configured to be identical value (20 μm) on four positions (the tooth tip on the one end side in the tooth width direction, the tooth root on the one end side in the tooth width direction, the tooth tip on the other end side in the tooth width direction, and the tooth root on the other end side in the tooth width direction) of the tooth surface 11.

The single tooth-surface meshing test is performed under the condition similar to the resin helical gear 1 according to the first embodiment except that the load torque to be applied is in a range of 0.1 Nm to 0.3 Nm. That is, since the resin helical gear 1 according to the embodiment is a resin helical gear used under a condition where the large load torque (0.1 Nm to 0.3 Nm) compared with the resin helical gear 1 according to the first embodiment acts, the single tooth-surface meshing test is performed in a range of the load torque acting in use.

According to the result of the first meshing test illustrated in FIG. 12A, the product 2 of the present invention has small values of the rotation transmission error compared with the unmodified helical gear. According to the result of the second meshing test illustrated in FIG. 12B, the product 2 of the present invention has values of the rotation transmission error that is small compared with the unmodified helical gear or similar to the unmodified helical gear. According to the result of the third meshing test illustrated in FIG. 12C, the product 2 of the present invention has the rotation transmission error significantly decreased compared with the unmodified helical gear. Especially, the difference between the rotation transmission error of the product 2 of the present invention and the rotation transmission error of the unmodified helical gear increases in accordance with the increase of the load torque. As described above, the product 2 of the present invention ensures the rotation transmission error to be constantly decreased compared with the standardly used unmodified helical gear irrespective of the direction of the misalignment.

A table 2 below indicates the results of the single tooth-surface meshing tests (first to third meshing tests) of measurement target products (product 2 of the present invention, first to fourth comparative examples) in a range of the load torque of 0.1 Nm to 0.3 Nm (see FIG. 12, FIG. 5 to FIG. 8). In the table 2, "GOOD" marks indicate cases (good cases) where the measurement target products have the rotation transmission errors equivalent or decreased compared with the rotation transmission error of the unmodified helical gear. "POOR" marks indicate cases (bad cases) where the measurement target products have the rotation transmission errors increased compared with the rotation transmission error of the unmodified helical gear.

TABLE 2

| | FIRST MESHING TEST | SECOND MESHING TEST | THIRD MESHING TEST |
|---|---|---|---|
| PRODUCT 2 OF PRESENT INVENTION | GOOD | GOOD | GOOD |
| FIRST COMPARATIVE EXAMPLE | POOR | POOR | GOOD |
| SECOND COMPARATIVE EXAMPLE | POOR | GOOD | GOOD |
| THIRD COMPARATIVE EXAMPLE | POOR | GOOD | GOOD |
| FOURTH COMPARATIVE EXAMPLE | GOOD | POOR | POOR |

Figure 13A:
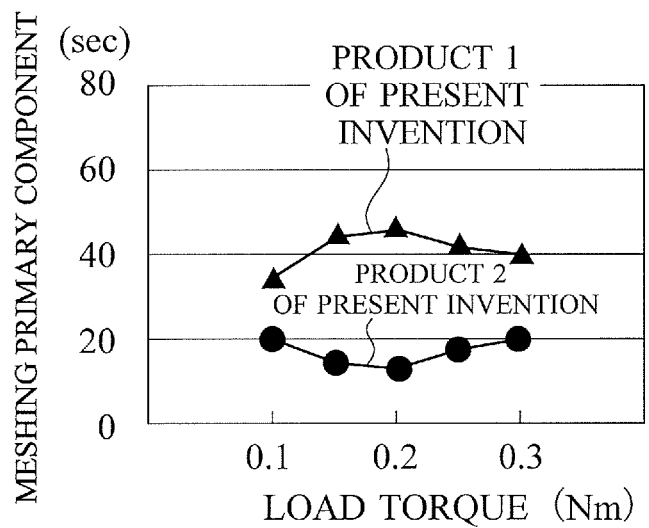
FIGS. 13A-13C are diagrams illustrating results measured in a single tooth-surface meshing test on a meshing primary component as a rotation transmission error of a product 2 of the present invention compared with results measured in a single tooth-surface meshing test on a meshing primary component as a rotation transmission error of a product 1 of the present invention with the settings of the meshing states of the teeth illustrated in FIGS. 2(a-2), (b-2), and (c-2).
Figure 13B:
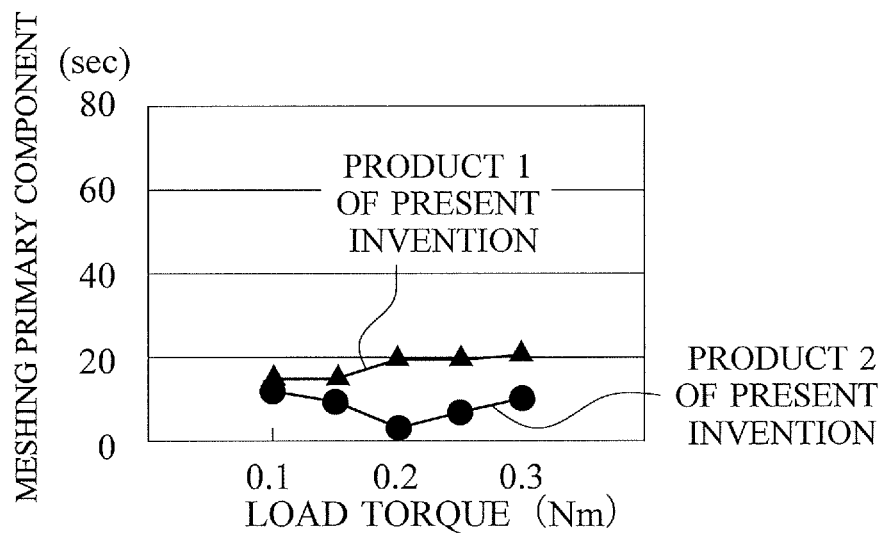
Figure 13C:
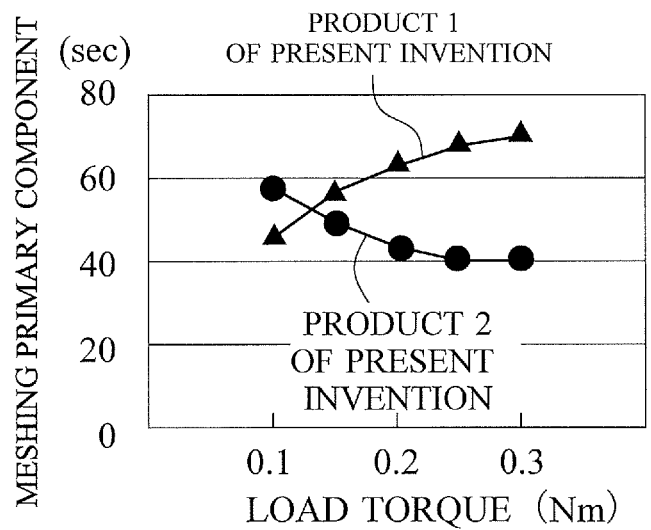

FIGS. 13A-13C are diagrams illustrating results measured in the single tooth-surface meshing test on the meshing primary component as the rotation transmission error of the product 2 of the present invention compared with results measured in the single tooth-surface meshing test on the meshing primary component as the rotation transmission error of the product 1 of the present invention with the settings of the meshing states of the teeth illustrated in FIGS. 2(a-2), (b-2), and (c-2). FIG. 13A is a diagram illustrating the result of the single tooth-surface meshing test (first meshing test) in the meshing state of the teeth in FIG. 2(a-2). FIG. 13B is a diagram illustrating the result of the single tooth-surface meshing test (second meshing test) in the meshing state of the teeth in FIG. 2(b-2). FIG. 13C is a diagram illustrating the result of the single tooth-surface meshing test (third meshing test) in the meshing state of the teeth in FIG. 2(c-2). In FIGS. 13A to C, a horizontal axis indicates a load torque (Nm), and a vertical axis indicates a meshing primary component (sec) of the rotation transmission error. In the following description, the meshing primary component as the rotation transmission error is abbreviated as a rotation transmission error as necessary.

According to the result of the first meshing test illustrated in FIG. 13A, the product 2 of the present invention has small values of the rotation transmission error compared with the product 1 of the present invention in the range of the load torque of 0.1 Nm to 0.3 Nm. According to the result of the second meshing test illustrated in FIG. 13B, the product 2 of the present invention has small values of the rotation transmission error compared with the product 1 of the present invention in the range of the load torque of 0.1 Nm to 0.3 Nm. According to the result of the third meshing test illustrated in FIG. 13C, the product 2 of the present invention has the rotation transmission error significantly decreased compared with the product 1 of the present invention in the range of the load torque of 0.15 Nm to 0.3 Nm. Especially, the difference between the rotation transmission error of the product 2 of the present invention and the rotation transmission error of the product 1 of the present invention increases in accordance with the increase of the load torque in the range of the load torque of 0.15 Nm to 0.3 Nm. As described above, the product 2 of the present invention ensures the rotation transmission error to be decreased compared with the product 1 of the present invention irrespective of the direction of the misalignment at least in the range of the load torque of 0.15 Nm to 0.3 Nm.

(Modification 1 of Second Embodiment)

Figure 14A:
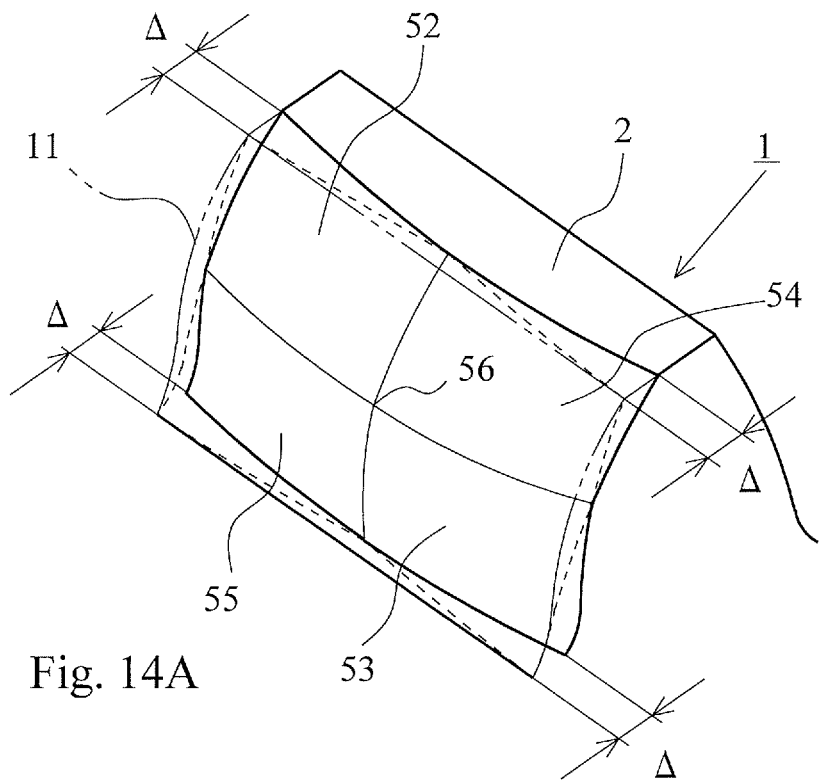
FIG. 14A is a perspective view illustrating a tooth of a resin helical gear according to a modification 1 of the second embodiment of the present invention viewed obliquely from above.
Figure 14B:
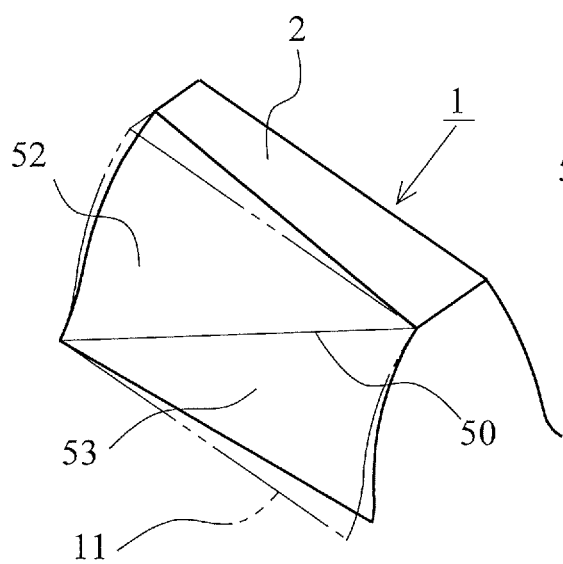
FIG. 14B is a first auxiliary view for explaining a shape of the tooth of FIG. 14A.
Figure 14C:
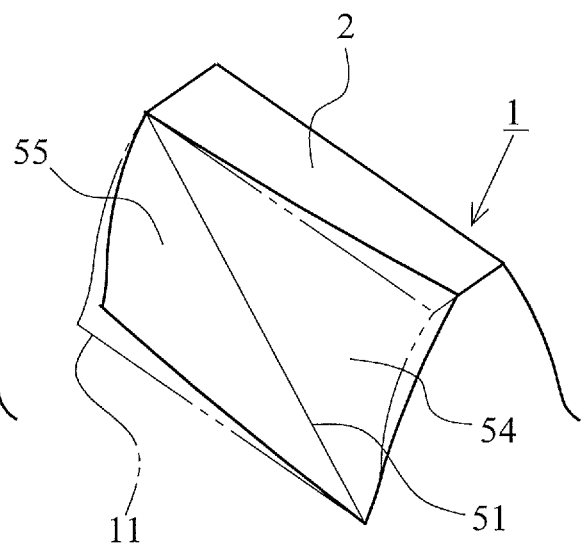
FIG. 14C is a second auxiliary view for explaining the shape of the tooth of FIG. 14A.

FIG. 14A is a perspective view illustrating the tooth 2 of the resin helical gear 1 according to a modification 1 of the second embodiment of the present invention viewed obliquely from above. FIG. 14B is a first auxiliary view for explaining a shape of the tooth 2 of FIG. 14A. FIG. 14C is a second auxiliary view for explaining the shape of the tooth 2 of FIG. 14A.

As illustrated in FIG. 14, the tooth 2 of the resin helical gear 1 according to the modification is formed by performing the three-dimensional tooth-surface modification on the tooth surface 11 of the tooth 2 having the involute tooth profile form. That is, in this modification, while a first machining reference line 50 (see FIG. 14B) obliquely coupling a tooth tip side of the tooth 2 on one end side in a tooth width direction to a tooth root side of the tooth 2 on another end side in the tooth width direction along the tooth surface 11, and a second machining reference line 51 (see FIG. 14C) obliquely coupling a tooth tip side of the tooth 2 on the other end side in the tooth width direction to a tooth root side of the tooth 2 on the one end side in the tooth width direction along the tooth surface 11 are set, the tooth surface 11 (one tooth surface of both tooth surfaces) used for meshing of the teeth 2 has the first and second machining reference lines 50 and 51 as a criteria for the tooth-surface modification.

Then, on the tooth surface 11, the three-dimensional tooth-surface modification is performed (see FIG. 14A) such that the tooth surface 11 is cut out by a smooth first curved surface 52 from the first machining reference line 50 to the tooth tip of the tooth 2 on the other end side in the tooth width direction while the tooth surface 11 is cut out by a smooth second curved surface 53 from the first machining reference line 50 to the tooth root of the tooth 2 on the one end side in the tooth width direction (see FIG. 14B), and the tooth surface 11 is cut out by a smooth third curved surface 54 from the second machining reference line 51 to the tooth tip of the tooth 2 on the one end side in the tooth width direction while the tooth surface 11 is cut out by a smooth fourth curved surface 55 from the second machining reference line 51 to the tooth root of the tooth 2 on the other end side in the tooth width direction (see FIG. 14C). As a result, on the tooth 2, while an intersection point 56 of the first machining reference line 50 and the second machining reference line 51 is left as a point on the tooth surface 11 having the involute tooth profile form, the tooth surface is constituted of the first to fourth curved surfaces 52 to 55.

The tooth surface 11 of the resin helical gear 1 according to the modification described above has a shape where the diamond-shaped tooth surface portion 11a (tooth surface portion having the involute tooth profile form), on which the three-dimensional tooth-surface modification is not performed, on the tooth surface 11 of the resin helical gear 1 according to the second embodiment illustrated in FIG. 11A is removed. The resin helical gear 1 according to this modification provides the efficiency similar to the resin helical gear 1 according to the second embodiment.

(Modification 2 of Second Embodiment)

While the resin helical gear 1 according to the second embodiment is configured such that the three-dimensional tooth-surface modification is performed on one tooth surface of both tooth surfaces, not limiting to this, the three-dimensional tooth-surface modification may be performed on both tooth surfaces so as to decrease the rotation transmission errors in both forward and reverse directions in the case where the misalignment between the gear shafts occurs.

(Modification 3 of Second Embodiment)

While the resin helical gear 1 according to the second embodiment has the tooth surface 11 whose modification amounts $\Delta$ are 20 μm on the four positions (the tooth tip on the one end side in the tooth width direction, the tooth root on the one end side in the tooth width direction, the tooth tip on the other end side in the tooth width direction, and the tooth root on the other end side in the tooth width direction) in the above single tooth-surface meshing test, the modification amount $\Delta$ is not limited to this value, the modification amounts $\Delta$ on the respective positions of the four positions may be values different from one another, and the value of the modification $\Delta$ can be configured to be an optimum value corresponding to usage conditions and similar condition.

[Third Embodiment]

FIG. 15A is a perspective view illustrating a tooth 2 of a resin helical gear 1 according to a third embodiment of the present invention viewed obliquely from above. FIG. 15B is a first auxiliary view for explaining a shape of the tooth 2 of FIG. 15A. FIG. 15C is a second auxiliary view for explaining the shape of the tooth 2 of FIG. 15A.

As illustrated in FIGS. 15A-15C, the tooth 2 of the resin helical gear 1 according to the embodiment is formed by performing the three-dimensional tooth-surface modification on the tooth surface 11 of the tooth 2 having the involute tooth profile form. That is, in this embodiment, while a first machining reference line 57 (see FIG. 15B) obliquely coupling a tooth tip side of the tooth 2 on one end side in a tooth width direction to a tooth root side of the tooth on another end side in the tooth width direction along the tooth surface 11, and a second machining reference line 58 (see FIG. 15C) obliquely coupling a tooth tip side of the tooth 2 on the other end side in the tooth width direction to a tooth root side of the tooth on the one end side in the tooth width direction along the tooth surface 11 are set, the tooth surface 11 (one tooth surface of both tooth surfaces) used for meshing of the teeth 2 has the first and second machining reference lines 57 and 58 as a criteria for the tooth-surface modification. In FIG. 15A, a meshing contact line 44 is configured to run from the tooth tip side of the tooth 2 on the one end side in the tooth width direction to the tooth root side of the tooth 2 on the other end side in the tooth width direction obliquely across the tooth surface 11.

Then, on the tooth surface 11, the three-dimensional tooth-surface modification is performed (see FIG. 15A) such that the tooth surface 11 is cut out by a smooth first curved surface 60 (see FIG. 15B) from the first machining reference line 57 to a tooth root of the tooth 2 on one end side in the tooth width direction, and cut out by a smooth second curved surface 61 from the second machining reference line 58 to a tooth tip of the tooth 2 on the one end side in the tooth width direction, while the tooth surface 11 is cut out by a smooth third curved surface 62 (see FIG. 15C) from the second machining reference line 58 to a tooth root of the tooth 2 on another end side in the tooth width direction. On the tooth 2, a part of the second machining reference line 58 on the tooth tip side from an intersection point 63 of the first machining reference line 57 and the second machining reference line 58 is left as a line on the tooth surface 11 having the involute tooth profile form, thus the tooth surface is constituted of the first to third curved surfaces 60 to 62.

Figure 16A:
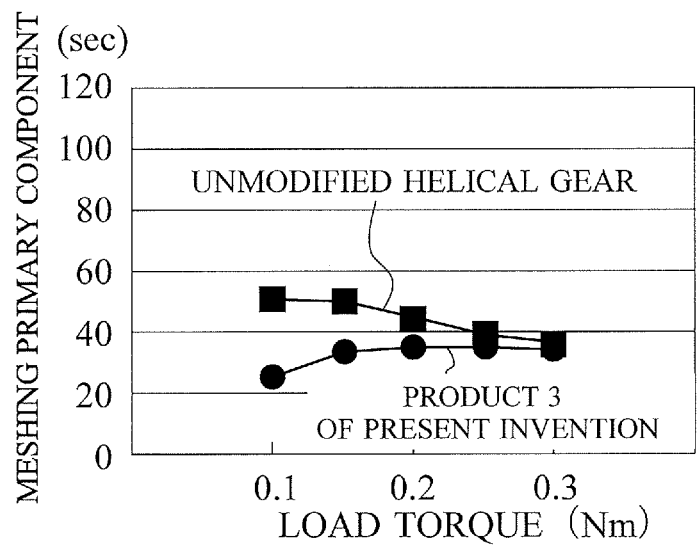
FIGS. 16A-16C are diagrams illustrating results measured in a single tooth-surface meshing test on a meshing primary component as a rotation transmission error of the resin helical gear according to the third embodiment of the present invention compared with results measured in a single tooth-surface meshing test on a meshing primary component as a rotation transmission error of a typically used resin helical gear (unmodified helical gear) on which a tooth-surface modification is not performed with the settings of the meshing states of the teeth illustrated in FIGS. 2(a-2), (b-2), and (c-2).
Figure 16B:
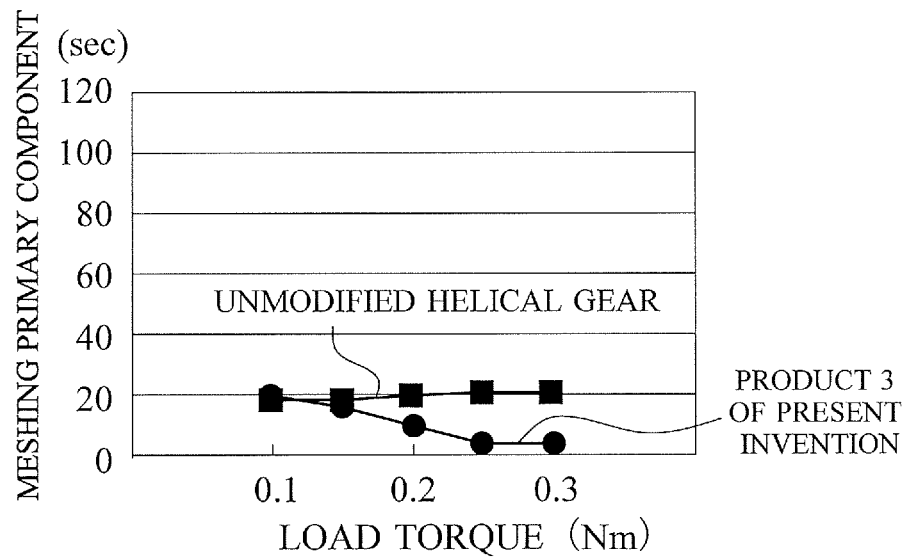
Figure 16C:
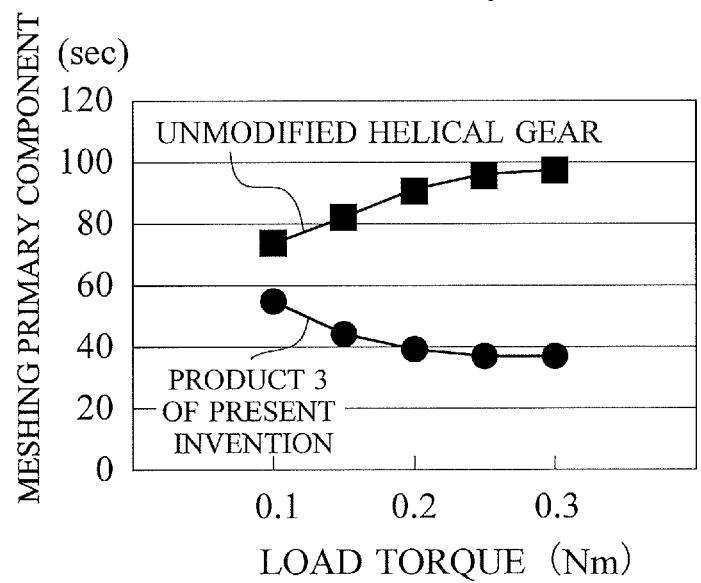

FIGS. 16A-16C are diagrams illustrating results measured in the single tooth-surface meshing test on the meshing primary component as the rotation transmission error of the resin helical gear 1 according to the embodiment compared with results measured in the single tooth-surface meshing test on the meshing primary component as the rotation transmission error of the typically used resin helical gear (unmodified helical gear) on which a tooth-surface modification is not performed with the settings of the meshing states of the teeth illustrated in FIGS. 2(a-2), (b-2), and (c-2). FIG. 16A is a diagram illustrating the result of the single tooth-surface meshing test (first meshing test) in the meshing state of the teeth in FIG. 2(a-2). FIG. 16B is a diagram illustrating the result of the single tooth-surface meshing test (second meshing test) in the meshing state of the teeth in FIG. 2(b-2). FIG. 16C is a diagram illustrating the result of the single tooth-surface meshing test (third meshing test) in the meshing state of the teeth in FIG. 2(c-2). In FIGS. 16A to C, the resin helical gear 1 according to the embodiment is indicated as a product 3 of the present invention. In FIGS. 16A to C, a horizontal axis indicates a load torque (Nm), and a vertical axis indicates a meshing primary component (sec) of the rotation transmission error. In the following description, the meshing primary component as the rotation transmission error is abbreviated as a rotation transmission error as necessary. The product 3 of the present invention has the tooth surface whose modification amounts $\Delta$ are configured to be identical value (20 pm) on three positions (the tooth tip on the one end side in the tooth width direction, the tooth root on the one end side in the tooth width direction, and the tooth root on the other end side in the tooth width direction) of the tooth surface.

The single tooth-surface meshing test is performed under the condition similar to the resin helical gear 1 according to the first embodiment except that the load torque to be applied is in a range of 0.1 Nm to 0.3 Nm. That is, since the resin helical gear 1 according to the embodiment is a resin helical gear used under a condition where the large load torque (0.1 Nm to 0.3 Nm) compared with the resin helical gear 1 according to the first embodiment acts, the single tooth-surface meshing test is performed in a range of the load torque acting in use.

According to the result of the first meshing test illustrated in FIG. 16A, the product 3 of the present invention has small values of the rotation transmission error compared with the unmodified helical gear. According to the result of the second meshing test illustrated in FIG. 16B, the product 3 of the present invention has values of the rotation transmission error that is small compared with the unmodified helical gear or similar to the unmodified helical gear. Moreover, the product 3 of the present invention has values of the rotation transmission error extremely small compared with the result of the first meshing test. According to the result of the third meshing test illustrated in FIG. 16C, the product 3 of the present invention has the rotation transmission error significantly decreased compared with the unmodified helical gear. Especially, the difference between the rotation transmission error of the product 3 of the present invention and the rotation transmission error of the unmodified helical gear increases in accordance with the increase of the load torque. As described above, the product 3 of the present invention ensures the rotation transmission error to be constantly decreased compared with the standardly used unmodified helical gear irrespective of the direction of the misalignment.

A table 3 below indicates the results of the single tooth-surface meshing tests (first to third meshing tests) of measurement target products (product 3 of the present invention, first to fourth comparative examples) in a range of the load torque of 0.1 Nm to 0.3 Nm (see FIG. 16, FIG. 5 to FIG. 8). In the table 3, "GOOD" marks indicate cases (good cases) where the measurement target products have the rotation transmission errors equivalent or decreased compared with the rotation transmission error of the unmodified helical gear. "POOR" marks indicate cases (bad cases) where the measurement target products have the rotation transmission errors increased compared with the rotation transmission error of the unmodified helical gear.

TABLE 3

|  | FIRST MESHING TEST | SECOND MESHING TEST | THIRD MESHING TEST |
| --- | --- | --- | --- |
| PRODUCT 3 OF PRESENT INVENTION | GOOD | GOOD | GOOD |
| FIRST COMPARATIVE EXAMPLE | POOR | POOR | GOOD |
| SECOND COMPARATIVE EXAMPLE | POOR | GOOD | GOOD |
| THIRD COMPARATIVE EXAMPLE | POOR | GOOD | GOOD |
| FOURTH COMPARATIVE EXAMPLE | GOOD | POOR | POOR |

Figure 17A:
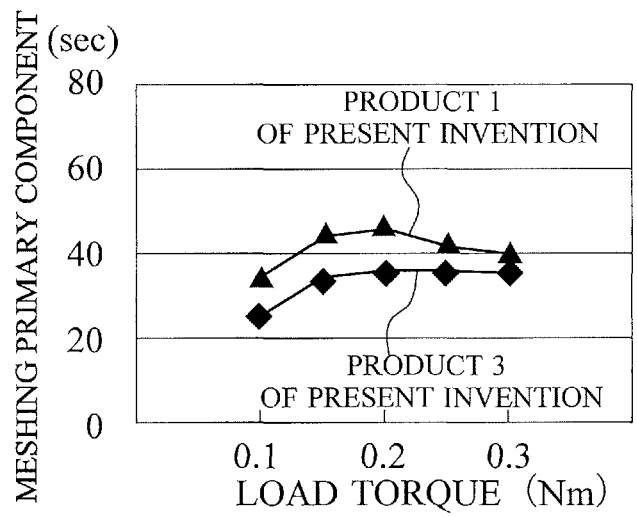
FIGS. 17A-17C are diagrams illustrating results measured in a single tooth-surface meshing test on a meshing primary component as a rotation transmission error of a product 3 of the present invention compared with results measured in a single tooth-surface meshing test on a meshing primary component as a rotation transmission error of the product 1 of the present invention with the settings of the meshing states of the teeth illustrated in FIGS. 2(a-2), (b-2), and (c-2).
Figure 17B:
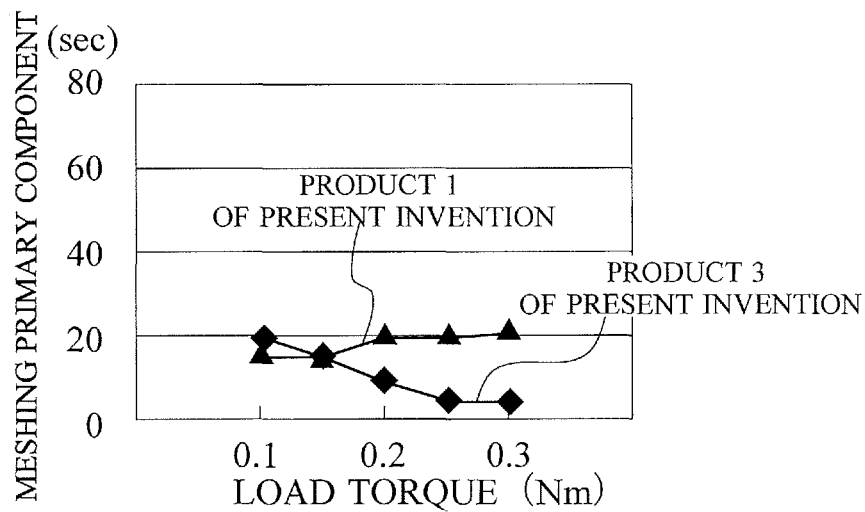
Figure 17C:
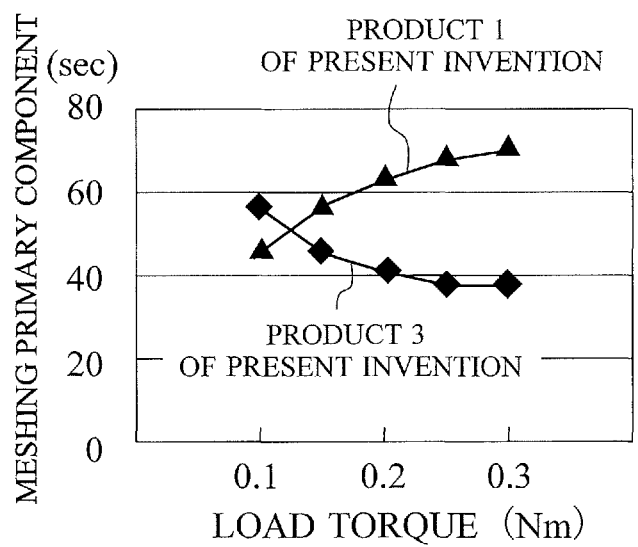

FIGS. 17A-17C are diagrams illustrating results measured in the single tooth-surface meshing test on the meshing primary component as the rotation transmission error of the product 3 of the present invention compared with results measured in the single tooth-surface meshing test on the meshing primary component as a rotation transmission error of the product 1 of the present invention with the settings of the meshing states of the teeth illustrated in FIGS. 2(a-2), (b-2), and (c-2). FIG. 17A is a diagram illustrating the result of the single tooth-surface meshing test (first meshing test) in the meshing state of the teeth in FIG. 2(a-2). FIG. 17B is a diagram illustrating the result of the single tooth-surface meshing test (second meshing test) in the meshing state of the teeth in FIG. 2(b-2). FIG. 17C is a diagram illustrating the result of the single tooth-surface meshing test (third meshing test) in the meshing state of the teeth in FIG. 2(c-2). In FIGS. 17A to C, a horizontal axis indicates a load torque (Nm), and a vertical axis indicates a meshing primary component (sec) of the rotation transmission error. In the following description, the meshing primary component as the rotation transmission error is abbreviated as a rotation transmission error as necessary.

According to the result of the first meshing test illustrated in FIG. 17A, the product 3 of the present invention has small values of the rotation transmission error compared with the product 1 of the present invention in the range of the load torque of 0.1 Nm to 0.3 Nm. According to the result of the second meshing test illustrated in FIG. 17B, the product 3 of the present invention has small values of the rotation transmission error compared with the product 1 of the present invention in the range of the load torque of 0.15 Nm to 0.3 Nm. According to the result of the third meshing test illustrated in FIG. 17C, the product 3 of the present invention has the rotation transmission error significantly decreased compared with the product 1 of the present invention in the range of the load torque of 0.15 Nm to 0.3 Nm. Especially, the difference between the rotation transmission error of the product 3 of the present invention and the rotation transmission error of the product 1 of the present invention increases in accordance with the increase of the load torque in the range of the load torque of 0.15 Nm to 0.3 Nm. As described above, the product 3 of the present invention ensures the rotation transmission error to be decreased compared with the product 1 of the present invention irrespective of the direction of the misalignment at least in the range of the load torque of 0.15 Nm to 0.3 Nm.

(Modification 1 of Third Embodiment)

Figure 18A:
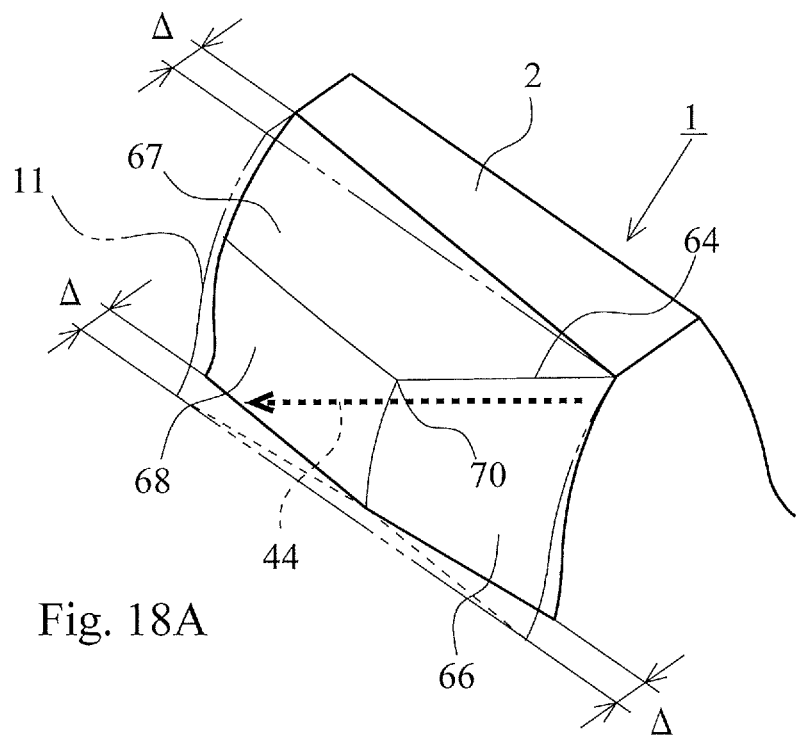
FIG. 18A is a perspective view illustrating a tooth of a resin helical gear according to a modification 1 of the third embodiment of the present invention viewed obliquely from above.
Figure 18B:
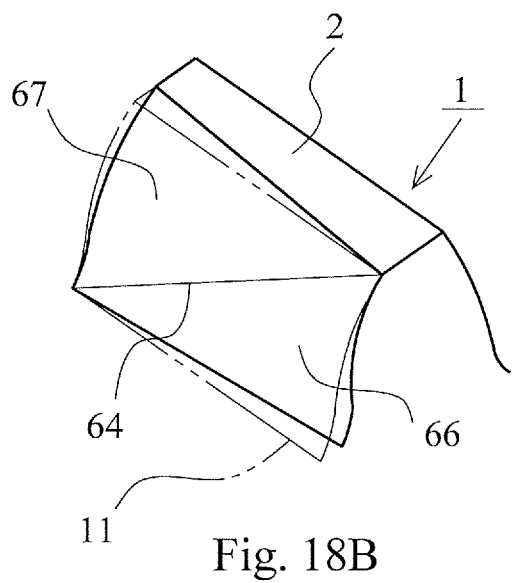
FIG. 18B is a first auxiliary view for explaining a shape of the tooth of FIG. 18A.
Figure 18C:
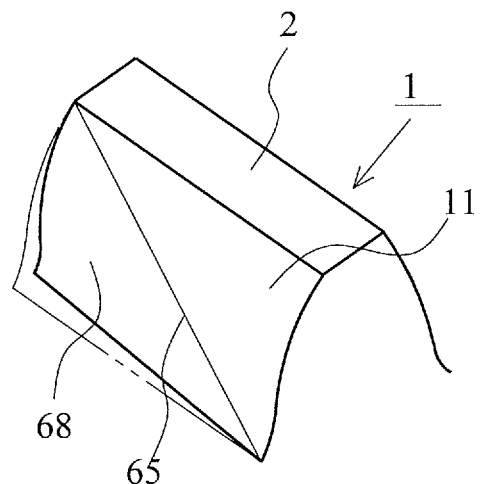
FIG. 18C is a second auxiliary view for explaining the shape of the tooth of FIG. 18A.

FIG. 18A is a perspective view illustrating a tooth 2 of a resin helical gear 1 according to a modification 1 of the third embodiment of the present invention viewed obliquely from above. FIG. 18B is a first auxiliary view for explaining a shape of the tooth 2 of FIG. 18A. FIG. 18C is a second auxiliary view for explaining the shape of the tooth 2 of FIG. 18A.

As illustrated in FIGS. 18A-18C, the tooth 2 of the resin helical gear 1 according to the modification is formed by performing the three-dimensional tooth-surface modification on the tooth surface 11 of the tooth 2 having the involute tooth profile form. That is, in this modification, while a first machining reference line 64 (see FIG. 18B) obliquely coupling a tooth tip side of the tooth 2 on one end side in a tooth width direction to a tooth root side of the tooth on another end side in the tooth width direction along the tooth surface 11, and a second machining reference line 65 (see FIG. 18C) obliquely coupling a tooth tip side of the tooth 2 on the other end side in the tooth width direction to a tooth root side of the tooth 2 on the one end side in the tooth width direction along the tooth surface 11 are set, the tooth surface 11 (one tooth surface of both tooth surfaces) used for meshing of the teeth 2 has the first and second machining reference lines 64 and 65 as a criteria for the tooth-surface modification.

Then, on the tooth surface 11, the three-dimensional tooth-surface modification is performed (see FIG. 18A) such that the tooth surface 11 is cut out by a smooth first curved surface 66 from the first machining reference line 64 to the tooth root of the tooth 2 on the one end side in the tooth width direction while the tooth surface 11 is cut out by a smooth second curved surface 67 from the first machining reference line 64 to the tooth tip of the tooth on the other end side in the tooth width direction (see FIG. 18B), and the tooth surface 11 is cut out by a smooth third curved surface 68 from the second machining reference line 65 to the tooth root of the tooth 2 on the other end side in the tooth width direction (see FIG. 18C). On the tooth surface 11, a part of the first machining reference line 64 on the tooth tip side from an intersection point 70 of the first machining reference line 64 and the second machining reference line 65 is left as a line on the tooth surface 11 having the involute tooth profile form, thus the tooth surface is constituted of the first to third curved surfaces 66 to 68.

The tooth surface 11 of the resin helical gear 1 according to the modification described above has the tooth tip on the other end side in the tooth width direction modified by Δ by the three-dimensional tooth-surface modification while the tooth surface 11 has the tooth tip on the one end side in the tooth width direction unmodified by the three-dimensional tooth-surface modification (see FIG. 18A). In contrast to this, the tooth surface 11 of the resin helical gear 1 according to the third embodiment illustrated in FIG. 15A has the tooth tip on the one end side in the tooth width direction modified by Δ by the three-dimensional tooth-surface modification while the tooth surface 11 has the tooth tip on the other end side in the tooth width direction unmodified by the three-dimensional tooth-surface modification. Thus, the tooth surface 11 of the resin helical gear 1 according to the modification is common in a point that the tooth tip on only one side of both end sides in the tooth width direction is modified. Such resin helical gear 1 according to the modification provides the efficiency similar to the resin helical gear 1 according to the third embodiment.

(Modification 2 of Third Embodiment)

While the resin helical gear 1 according to the third embodiment is configured such that the three-dimensional tooth-surface modification is performed on one tooth surface of both tooth surfaces, not limiting to this, the three-dimensional tooth-surface modification may be performed on both tooth surfaces so as to decrease the rotation transmission errors in both forward and reverse directions in the case where the misalignment between the gear shafts occurs.

(Modification 3 of Third Embodiment)

While the resin helical gear 1 according to the third embodiment has the tooth surface 11 whose modification amounts Δ are 20 μm on the three positions (the tooth tip on the one end side in the tooth width direction, the tooth root on the one end side in the tooth width direction, and the tooth root on the other end side in the tooth width direction) in the above single tooth-surface meshing test, the modification amount Δ is not limited to this value, the modification amounts Δ on the respective positions of the three positions may be values different from one another, and the value of the modification Δ can be configured to be an optimum value corresponding to usage conditions and similar condition.

[Fourth Embodiment]

Figure 19A:
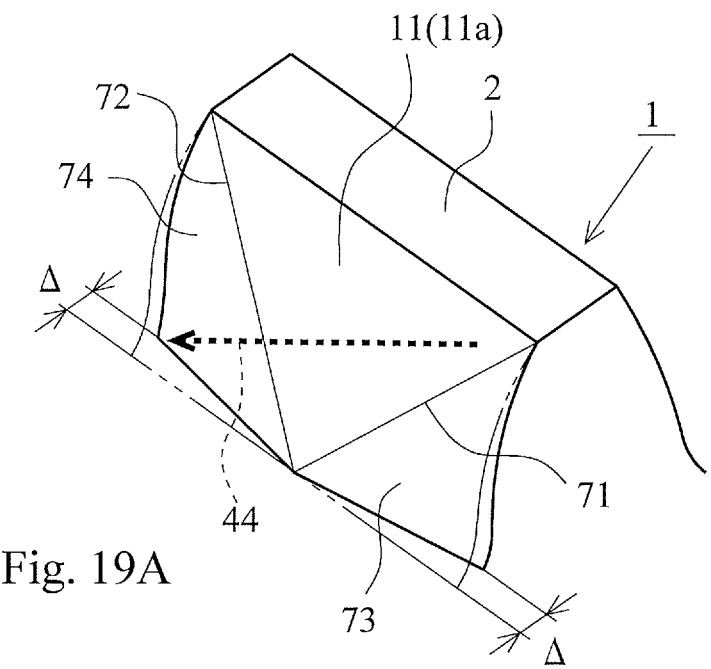
FIG. 19A is a perspective view illustrating a tooth of a resin helical gear according to a fourth embodiment of the present invention viewed obliquely from above.
Figures 19B, 19C:
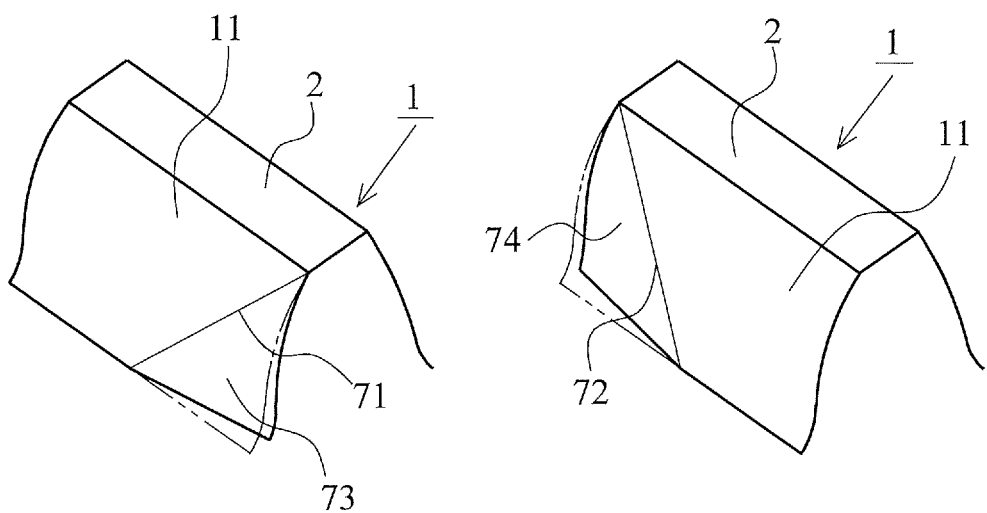
FIG. 19B is a first auxiliary view for explaining a shape of the tooth of FIG. 19A.
FIG. 19C is a second auxiliary view for explaining the shape of the tooth of FIG. 19A.

FIG. 19A is a perspective view illustrating a tooth 2 of a resin helical gear 1 according to a fourth embodiment of the present invention viewed obliquely from above. FIG. 19B is a first auxiliary view for explaining a shape of the tooth 2 of FIG. 19A. FIG. 19C is a second auxiliary view for explaining the shape of the tooth 2 of FIG. 19A.

As illustrated in FIGS. 19A-19C, the tooth 2 of the resin helical gear 1 according to the embodiment is formed by performing the three-dimensional tooth-surface modification on the tooth surface 11 of the tooth 2 having the involute tooth profile form. That is, in this embodiment, while a first machining reference line 71 (see FIG. 19B) obliquely coupling a tooth tip side of the tooth 2 on one end side in the tooth width direction to a tooth root side of the tooth 2 on a center in the tooth width direction along the tooth surface 11, and a second machining reference line 72 (see FIG. 19C) obliquely coupling a tooth tip side of the tooth 2 on the other end side in the tooth width direction to a tooth root side of the tooth 2 on a center in the tooth width direction along the tooth surface 11 are set, the tooth surface 11 (one tooth surface of both tooth surfaces) used for meshing of the teeth 2 has the first and second machining reference lines 71 and 72 as a criteria for the tooth-surface modification. In FIG. 19A, a meshing contact line 44 is configured to run from the tooth tip side of the tooth 2 on the one end side in the tooth width direction to the tooth root side of the tooth 2 on the other end side in the tooth width direction obliquely across the tooth surface 11.

Then, on the tooth surface 11, the three-dimensional tooth-surface modification is performed (see FIG. 19A) such that the tooth surface 11 is cut out by a smooth first curved surface 73 (see FIG. 19B) from the first machining reference line 71 to the tooth root of the tooth 2 on the one end side in the tooth width direction, and cut out by a smooth second curved surface 74 (see FIG. 19C) from the second machining reference line 72 to the tooth root of the tooth 2 on the other end side in the tooth width direction.

The tooth 2 of the resin helical gear 1 according to the embodiment has an approximately triangular-shaped portion on the tooth tip side with respect to the first machining reference line 71 and the second machining reference line 72 left as a tooth surface portion 11a having the involute tooth profile form, and the tooth surface portion 11a having the involute tooth profile form has an area larger than an area of the tooth surface portion 11a having the involute tooth profile form on the tooth surface 11 of the resin helical gear 1 according to the first embodiment.

DESCRIPTION OF REFERENCE SIGNS

1: Resin helical gear
2: Tooth
11: Tooth surface
12: First machining reference line
13: Second machining reference line
15: First curved surface
16: Second curved surface

The invention claimed is:

1. A resin helical gear comprising a tooth having a three-dimensional tooth-surface modification on a tooth surface of the tooth such that the tooth has an involute tooth profile form, the tooth of the resin helical gear comprising:
  a tooth surface having defined thereon:
    a first machining reference line obliquely coupling a tooth tip of the tooth on a first end side of the tooth surface in a tooth width direction to a tooth root of the tooth on a second end side of the tooth surface in the tooth width direction along the tooth; and
    a second machining reference line obliquely coupling the tooth tip of the tooth on the second end side of the tooth surface in the tooth width direction to the tooth root of the tooth on the first end side of the tooth surface in the tooth width direction;
  wherein the tooth surface has the three-dimensional tooth-surface modification including a smooth first curved surface extending from the first machining reference line to the tooth root of the tooth on the first end side in the tooth width direction, and including a smooth second curved surface extending from the second machining reference line to the tooth root of the tooth on the second end side in the tooth width direction, the three-dimensional tooth-surface modification forming the involute tooth profile form on the tooth tip side of the tooth between the first machining reference line and the second machining reference line; and
  wherein the three-dimensional tooth-surface modification of the tooth surface has a ridgeline extending from an intersection point of the first machining reference line and the second machining reference line to the tooth root along a tooth length direction, the ridgeline being located between the first curved surface and the second curved surface.

2. The resin helical gear according to claim 1, wherein the three-dimensional tooth-surface modification is located on at least one of two opposite tooth surfaces of the tooth.

3. The resin helical gear according to claim 1, wherein the three-dimensional tooth-surface modification is located on both of two opposite tooth surfaces of the tooth.

4. The resin helical gear according to claim 1, wherein a modification amount of the three-dimensional tooth-surface modification along the first curved surface is different than a modification amount of the three-dimensional tooth-surface modification along the second curved surface.

5. The resin helical gear according to claim 4, wherein the modification amount of the three-dimensional tooth-surface modification along the first curved surface is larger than the modification amount of the three-dimensional tooth-surface modification along the second curved surface.

* * * * *